US010194459B2

(12) United States Patent
Kim et al.

(10) Patent No.: US 10,194,459 B2
(45) Date of Patent: Jan. 29, 2019

(54) METHOD OF TRANSMITTING AND RECEIVING MESSAGE FOR COMMUNICATION BETWEEN UES IN WIRELESS COMMUNICATION SYSTEM AND APPARATUS USING METHOD

(71) Applicant: LG ELECTRONICS INC., Seoul (KR)

(72) Inventors: Dongsoo Kim, Seoul (KR); Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 49 days.

(21) Appl. No.: 15/435,109

(22) Filed: Feb. 16, 2017

(65) Prior Publication Data

US 2017/0245245 A1 Aug. 24, 2017

Related U.S. Application Data

(60) Provisional application No. 62/297,090, filed on Feb. 18, 2016.

(51) Int. Cl.
*H04W 72/12* (2009.01)

(52) U.S. Cl.
CPC ............... *H04W 72/1284* (2013.01)

(58) Field of Classification Search
CPC .................................................. H04W 72/04
USPC ........................................................ 370/329
See application file for complete search history.

(56) References Cited

U.S. PATENT DOCUMENTS

| 2015/0004901 A1* | 1/2015 | Agiwal ................ H04W 76/14 455/39 |
| 2017/0134080 A1* | 5/2017 | Rahman ............... H04B 7/0456 |
| 2017/0150490 A1* | 5/2017 | Chen .................... H04B 1/3822 |
| 2018/0035276 A1* | 2/2018 | Kang .................... H04W 8/005 |

* cited by examiner

*Primary Examiner* — Brandon M Renner
*Assistant Examiner* — Abdeltif Ajid
(74) *Attorney, Agent, or Firm* — Lee, Hong, Degerman, Kang & Waimey

(57) ABSTRACT

Disclosed is a method of transmitting and receiving a message for a communication between UEs in a wireless communication system and an apparatus using the method. Specifically, in a method of relaying a V2X message by a first UE (User Equipment) in a wireless communication system supporting V2X (Vehicle-to-Everything) communication, the method may comprise steps of receiving the V2X message from a second UE, calculating a resource usage rate of a direct link between UEs, determining a relay scheme of the V2X message, by comparing the calculated resource usage rate and a predetermined threshold, and transferring the V2X message to a third UE based on the determined relay scheme.

20 Claims, 11 Drawing Sheets

[FIG. 1]
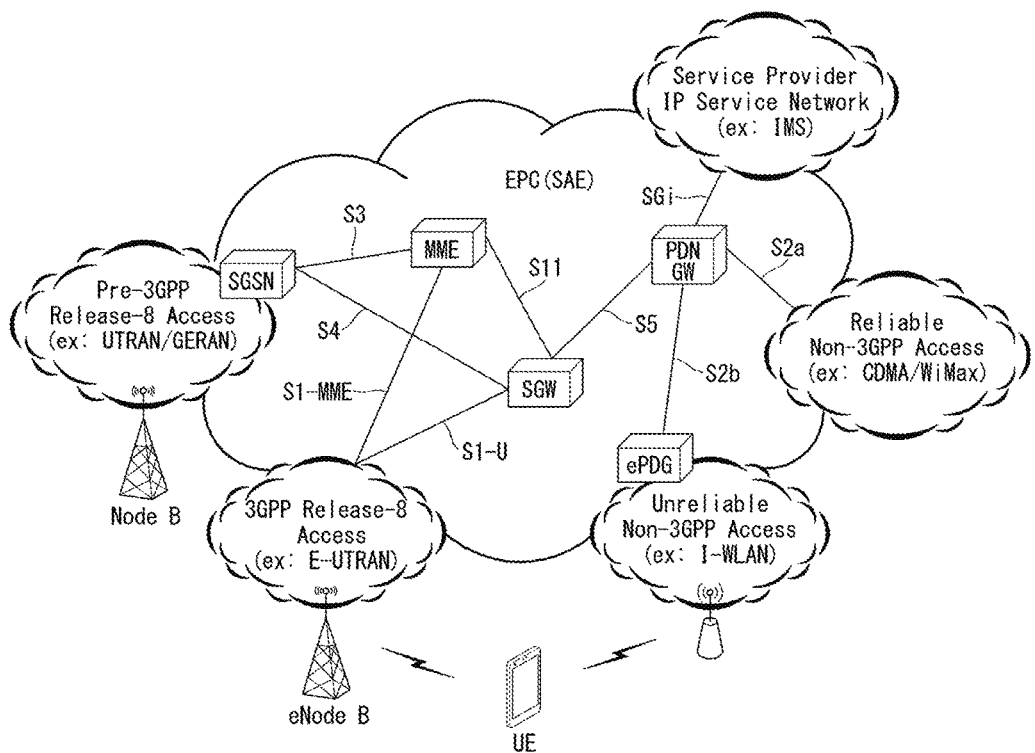

[FIG. 2]
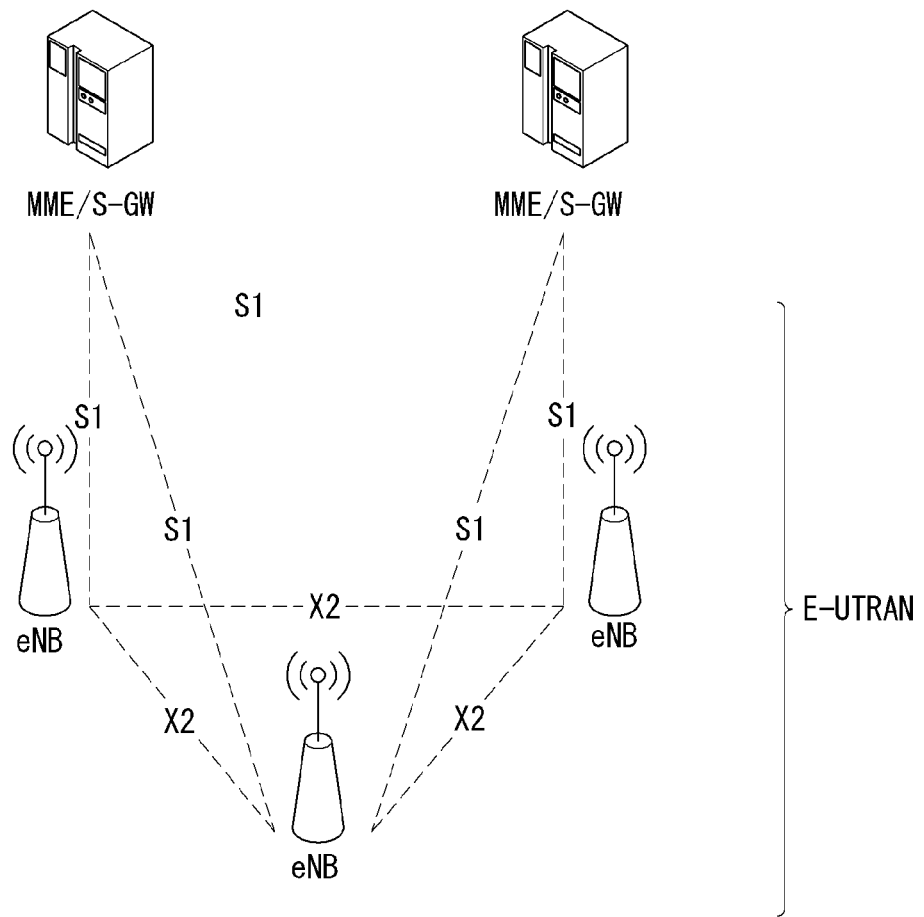

[FIG. 3]
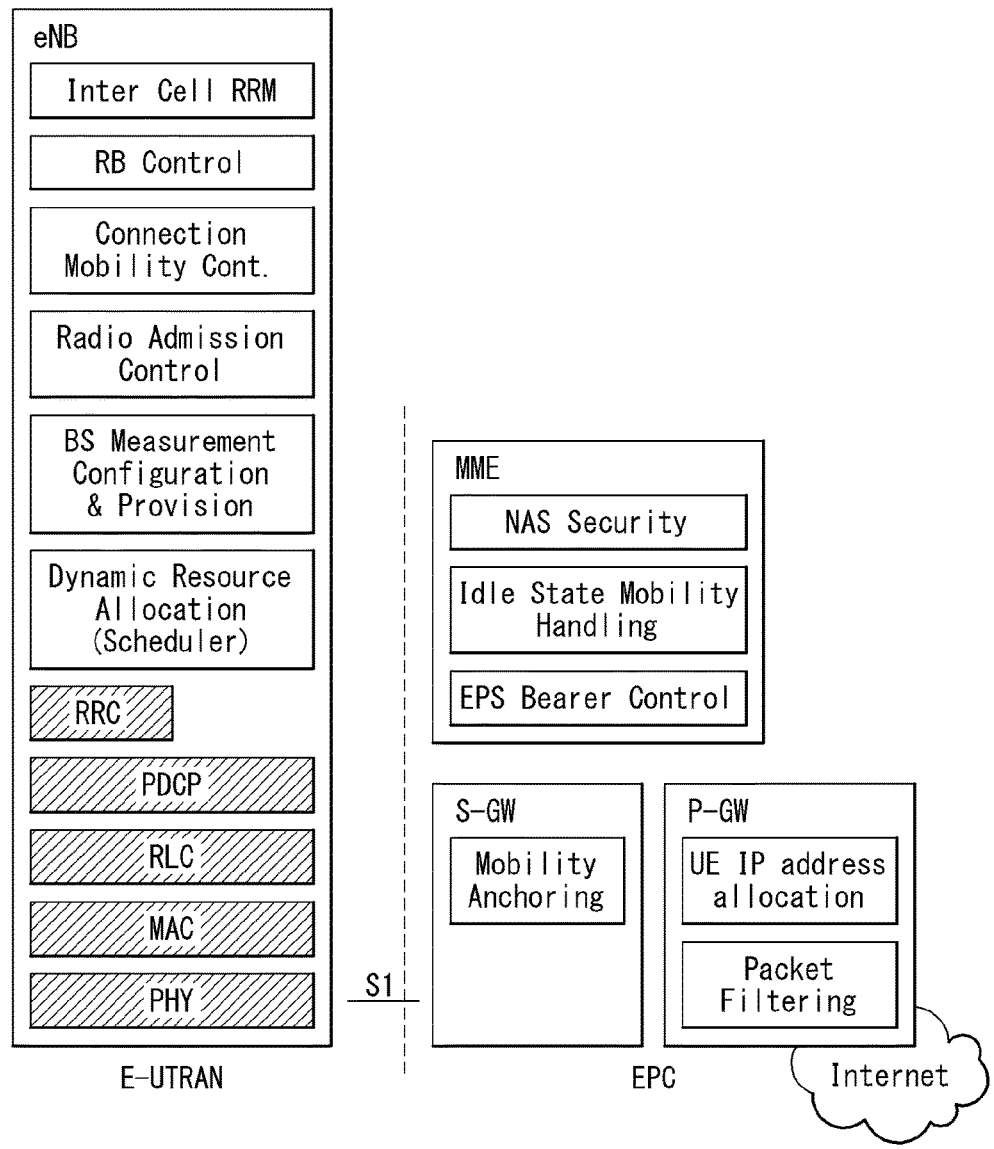

[FIG. 4]
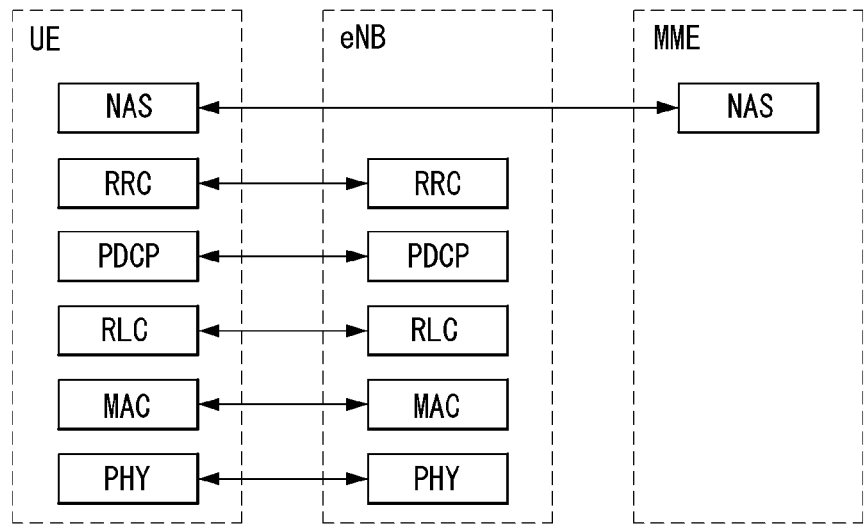
(a) Control Plane Protocol Stack
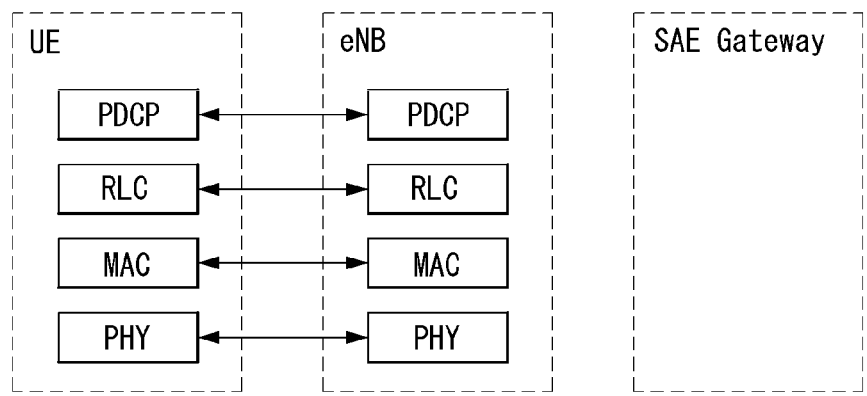
(b) User Plane Protocol Stack

[FIG. 5]
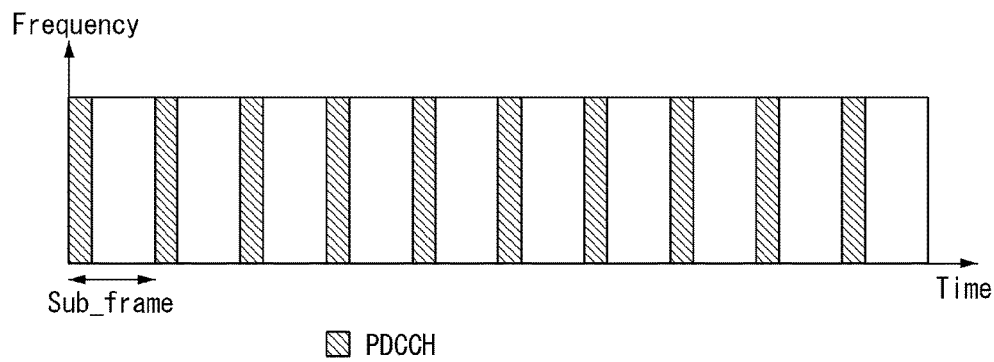
[FIG. 6]
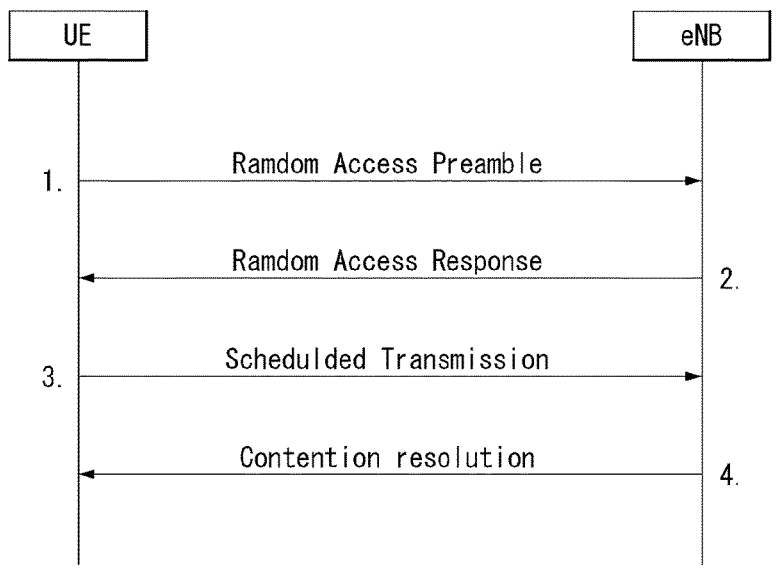

[FIG. 7]
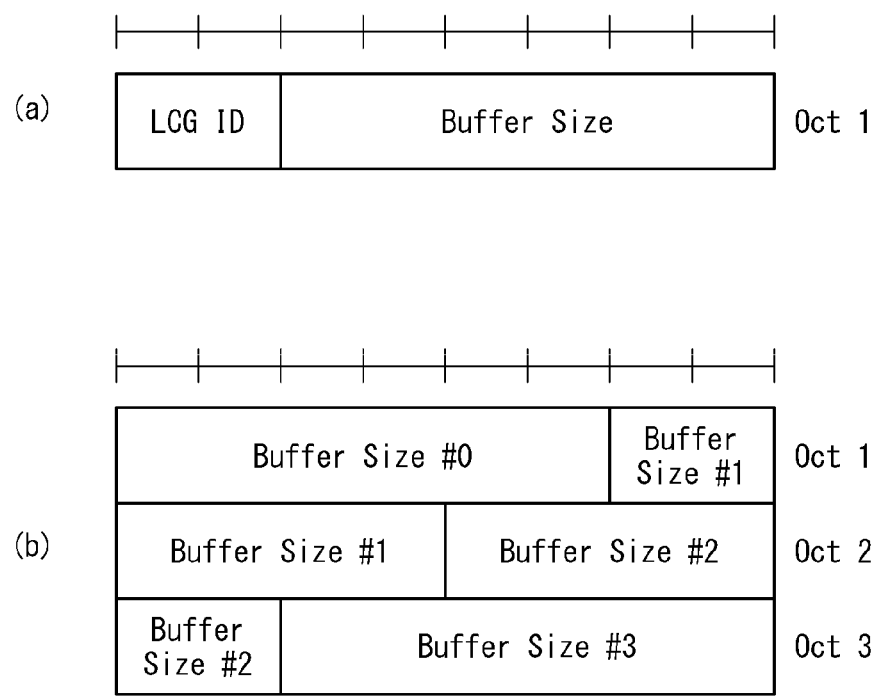

| Destination index$_1$ | LCG ID$_1$ | Buffer Size$_1$ | Oct 1 |
| Buffer Size$_1$ | Destination index$_2$ | | Oct 2 |
| LCG ID$_2$ | Buffer Size$_2$ | | Oct 3 |

...

| Destination index$_{N-1}$ | LCG ID$_{N-1}$ | Buffer Size$_{N-1}$ | Oct 1.5 * N−2 |
| Buffer Size$_{N-1}$ | Destination index$_N$ | | Oct 1.5 * N−1 |
| LCG ID$_N$ | Buffer Size$_N$ | | Oct 1.5 * N |

(b)

| Destination index$_1$ | LCG ID$_1$ | Buffer Size$_1$ | Oct 1 |
| Buffer Size$_1$ | Destination index$_2$ | | Oct 2 |
| LCG ID$_2$ | Buffer Size$_2$ | | Oct 3 |

...

| Destination index$_N$ | LCG ID$_N$ | Buffer Size$_N$ | | | | Oct 1.5 * N−0.5 |
| Buffer Size$_N$ | R | R | R | R | | Oct 1.5 * N+0.5 |

[FIG. 9]
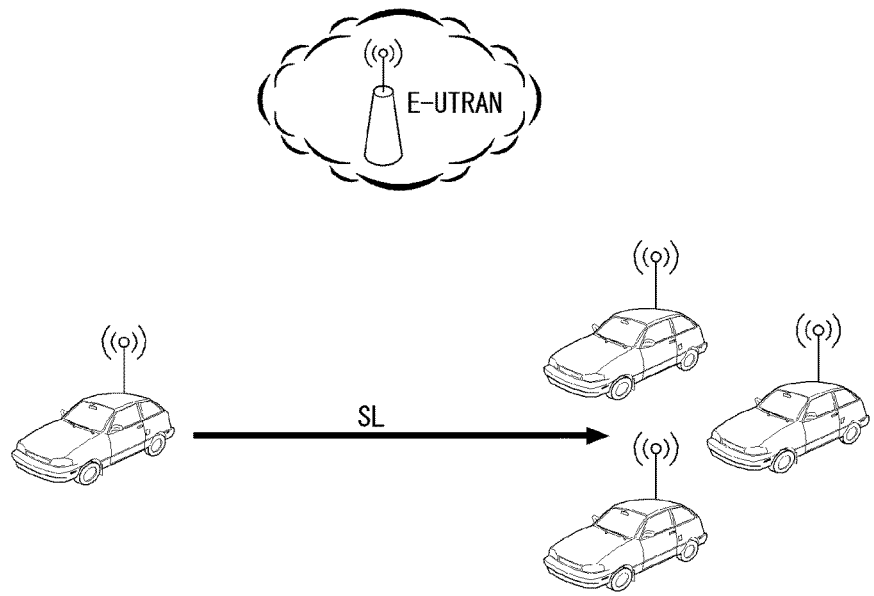
[FIG. 10]
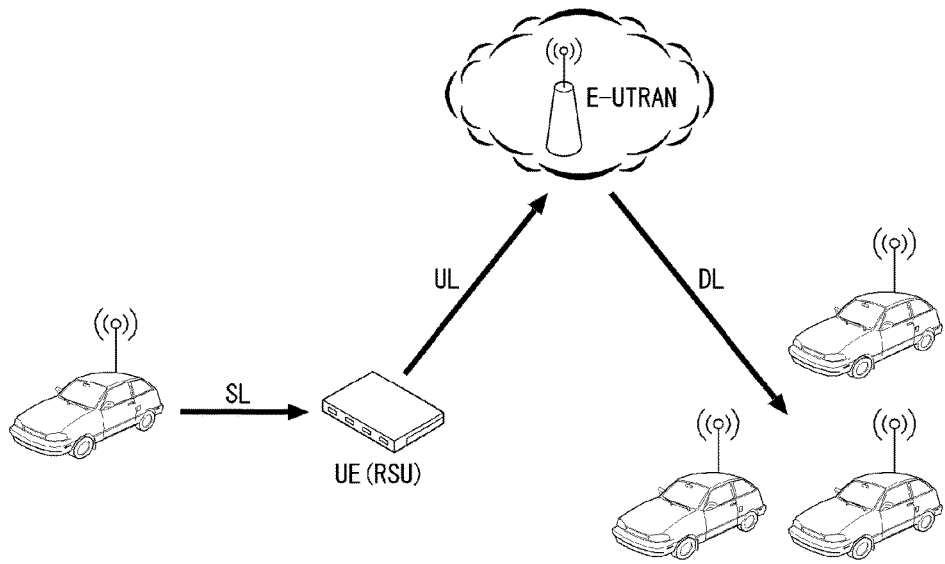

[FIG. 11]
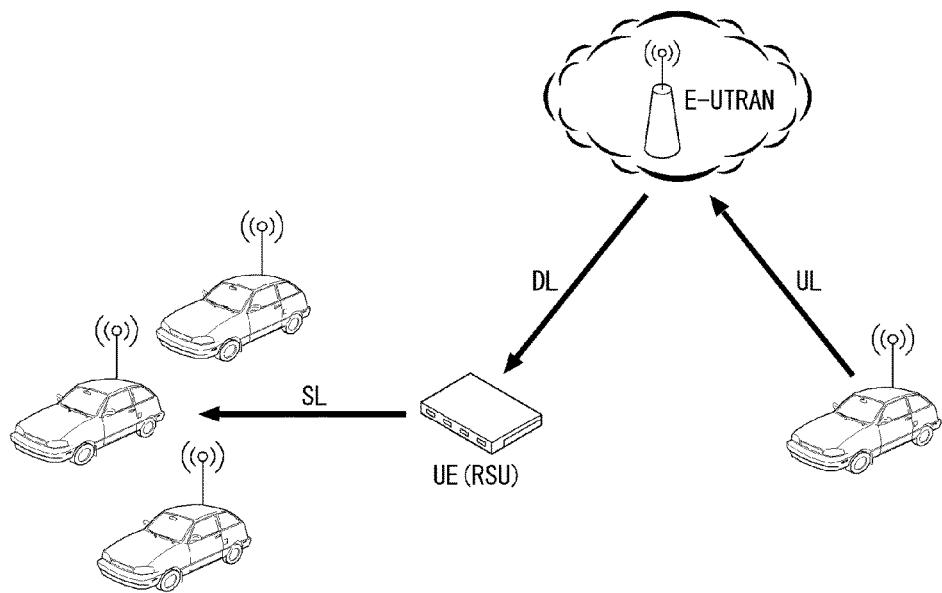

[FIG. 12]
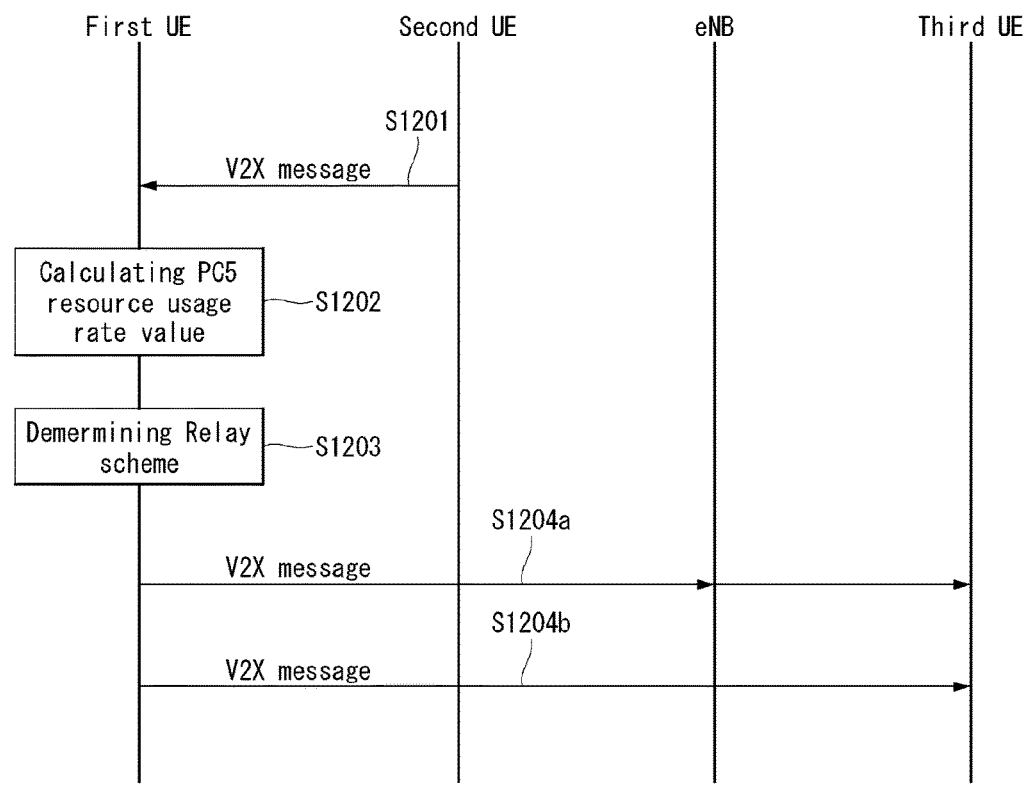

[FIG. 13]
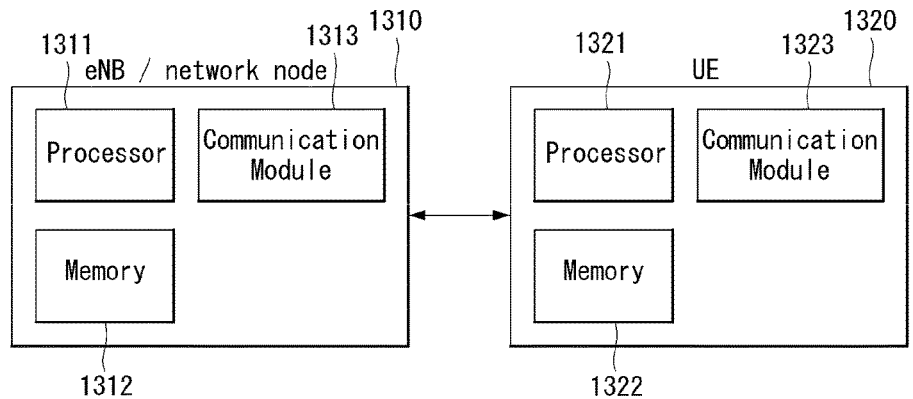
[FIG. 14]
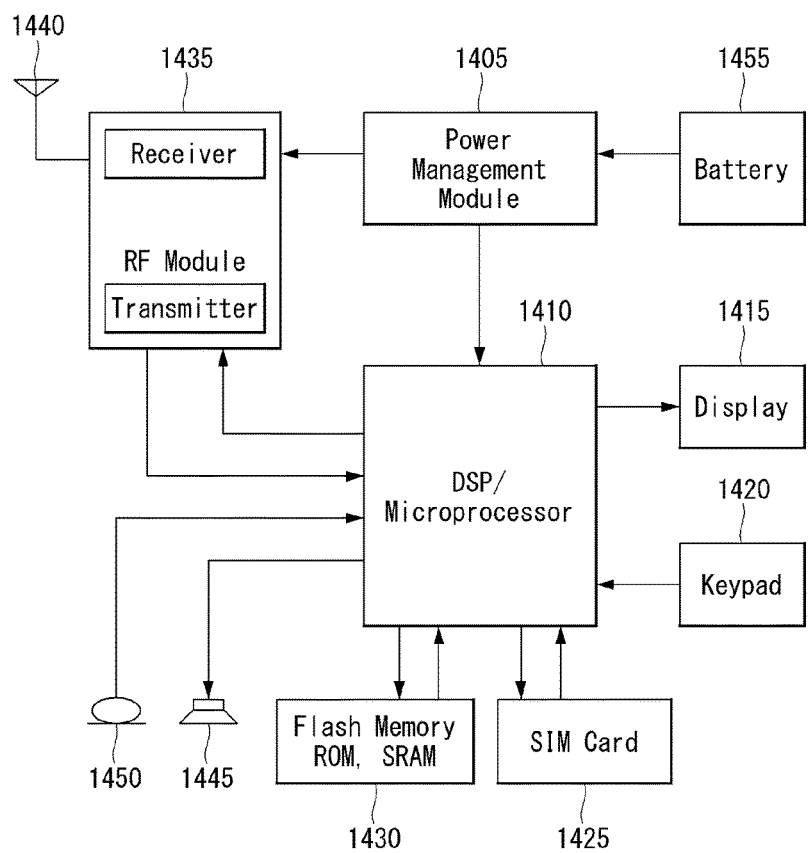

METHOD OF TRANSMITTING AND RECEIVING MESSAGE FOR COMMUNICATION BETWEEN UES IN WIRELESS COMMUNICATION SYSTEM AND APPARATUS USING METHOD

CROSS-REFERENCE TO RELATED APPLICATIONS

Pursuant to 35 U.S.C. § 119(e), this application claims the benefit of U.S. Provisional Application No. 62/297,090, filed on Feb. 18, 2016, the contents of which are hereby incorporated by reference herein in its entirety.

BACKGROUND OF THE INVENTION

Field of the Invention

The present invention relates to a wireless communication system, more particularly a method of transmitting and receiving a message for a communication between UEs in a wireless communication system supporting the communication between UEs (specifically, V2X (Vehicle-to-Everything) communication) and an apparatus for supporting the method.

Related Art

A mobile communication system has been developed to provide a voice service while guaranteeing user mobility. However, the mobile communication system has been extended to a service range to a data service as well as a voice service, and nowadays, a resource shortage phenomenon occurs due to explosive traffic increase and users request a higher speed service and thus a more enhanced mobile communication system is required.

A next generation mobile communication system should be able to support acceptance of explosive data traffic, epochal increase of a transmission rate per user, acceptance of the largely increased connection devices number, very low end-to-end latency, and high energy efficiency. For this reason, various technologies such as dual connectivity, Massive Multiple Input Multiple Output (Massive MIMO), In-band Full Duplex, Non-Orthogonal Multiple Access (NOMA), super wideband support, and device networking have been researched.

SUMMARY OF THE INVENTION

The present invention proposes a method of transmitting and receiving V2X (Vehicular to Everything) message in a wireless communication system.

Further, the present invention proposes a method of relaying the V2X message in a wireless communication system supporting the V2X communication.

The technical problems of the present invention are not limited to the above-described technical problems and the other technical problems will be understood by those skilled in the art from the following description.

An aspect of the present invention, in a method of relaying a V2X message by a first UE (User Equipment) in a wireless communication system supporting V2X (Vehicle-to-Everything) communication, the method may comprises steps of receiving the V2X message from a second UE, calculating a resource usage rate of a direct link between UEs, determining a relay scheme of the V2X message, by comparing the calculated resource usage rate and a predetermined threshold, and transferring the V2X message to a third UE based on the determined relay scheme.

An another aspect of the present invention, in a first UE (User Equipment) of relaying a V2X message in a wireless communication system supporting V2X communication, the first UE comprises a communication module for transmitting and receiving a signal, and a processor which controls the communication module, wherein the processor may receive the V2X message from a second UE, calculate a resource usage rate of a direct link between UEs, determine a relay scheme of the V2X message, by comparing the calculated resource usage rate and a predetermined threshold, and transfer the V2X message to a third UE based on the determined relay scheme.

Preferably, when the V2X message is transmitted from the second UE in a multicast scheme or a broadcast scheme, the V2X message may be transferred via an eNB to the third UE, or transferred via the direct link between UEs directly to the third UE.

Preferably, the threshold may be determined based on one or more of the number of UE and a resource usage status surrounding the first UE, a type of the V2X message, a type of the second UE, or a parameter from a network operator.

Preferably, when the V2X message is an event-driven message, the threshold thereof may be determined with a lower one than when the V2X message is a periodic message.

Preferably, when the type of the second UE is a public safety UE, the threshold thereof is determined with a lower one than when the type of the second UE is a normal UE.

Preferably, the type of the V2X message and/or the type of the second UE may be identified from an identifier (ID) of a Media Access Control (MAC) layer.

Preferably, wherein transferring the V2X message to the third UE may further comprise steps of transmitting a Buffer Status Report (BSR) to the eNB for allocating a resource of the direct link between UEs, when the resource usage rate is lower than the threshold, and transmitting the V2X message directly to the third UE on the resource of the direct link between UEs allocated from the eNB.

Preferably, wherein transferring the V2X message to the third UE may further comprises steps of transmitting the Buffer Status Report (BSR) to the eNB for allocating a uplink (UL) resource, when the resource of the direct link between UEs is not allocated from the eNB until a predetermined timer is expired, and transferring the V2X message via the eNB to the third UE, by transmitting the V2X message to the eNB on the uplink resource allocated from the eNB.

Preferably, wherein transferring the V2X message to the third UE may further comprises steps of transmitting to the eNB, a first Buffer Status Report (BSR) for allocating the resource of the direct link between UEs and a second BSR for allocating the uplink (UL) resource, when the resource usage rate is lower the threshold, transmitting the V2X message directly to the third UE on the allocated resource of the direct link between UEs, when the resource of direct link between UEs is allocated from the eNB, and transferring the V2X message via the eNB to the third UE, by transmitting the V2X message to the eNB on the allocated uplink resource, when the uplink resource is allocated from the eNB.

Preferably, wherein transferring the V2X message to the third UE may further comprises steps of selecting one resource of the allocated resource of the direct link between UEs and the allocated uplink resource, when both the resource of the direct link between UEs and the uplink resource is allocated, transmitting the V2X message directly to the third UE on the selected resource of the direct link between UEs, when the resource of the direct link between UEs is selected, and transferring the V2X message via the eNB to the third UE, by transmitting the V2X message to the eNB on the selected uplink resource, when the uplink resource is selected.

Preferably, wherein the one resource is selected randomly or based on a predetermined priority of the allocated resource of the direct link between UEs and the allocated uplink resource.

Preferably, wherein transferring the V2X message to the third UE may further comprises steps of transmitting the Buffer Status Report (BSR) to the eNB for allocating the uplink (UL) resource, when the resource usage rate is higher than the threshold, and transferring the V2X message via the eNB the eNB, by transmitting the V2X message to the eNB on the uplink resource allocated from the eNB.

Preferably, wherein the resource usage rate may be calculated based on current resource usage status information of the direct link between UEs received from other UE, eNB or V2X server and/or the number of UEs surrounding the first UE received from an eNB.

Preferably, wherein the V2X message is transferred via the eNB to the third UE, when the V2X message is transmitted from the second UE in a unicast scheme.

In accordance with an embodiment of the present invention, a collision in the V2X message may be minimized in a V2X wireless communication system.

In accordance with an embodiment of the present invention, the V2X message may be reliably or efficiently transmitted in the V2X wireless communication system.

The effect of the present invention is not limited to the above-described effects and the other objects will be understood by those skilled in the art from the following description.

BRIEF DESCRIPTION OF THE DRAWINGS

For understanding of the present invention, the attached drawings included as a portion of a detailed description provide an exemplary embodiment of the present invention and describe a technical characteristic of the present invention together with a detailed description.

FIG. 1 illustrates an Evolved Packet System (EPS) to which the present invention can be applied.

FIG. 2 illustrates an example of a structure of an evolved universal terrestrial radio access network (E-UTRAN) to which the present invention can be applied.

FIG. 3 illustrates a structure of an E-UTRAN and an EPC in a wireless communication system to which the present invention can be applied.

FIG. 4 illustrates a radio interface protocol structure between a UE and an E-UTRAN in a wireless communication system to which the present invention can be applied.

FIG. 5 illustrates a structure of a physical channel in a wireless communication system to which the present invention can be applied.

FIG. 6 illustrates a contention-based random access procedure in a wireless communication system to which the present invention can be applied.

FIG. 7 illustrates a structure of Buffer Status Report MAC Control Element in a wireless communication system to which the present invention can be applied.

FIG. 8 illustrates a structure of Sidelink Buffer Status Report MAC Control Element in a wireless communication system to which the present invention can be applied.

FIG. 9 illustrates V2X operation scenario 1 in a wireless communication system to which the present invention can be applied.

FIG. 10 illustrates V2X operation scenario 3A in a wireless communication system to which the present invention can be applied.

FIG. 11 illustrates V2X operation scenario 3B in a wireless communication system to which the present invention can be applied.

FIG. 12 is a diagram illustrating a method of transmitting and receiving a message for a communication between UEs, according to the present invention.

FIG. 13 is a block diagram illustrating a configuration of a communication device according to an exemplary embodiment of the present invention.

FIG. 14 is a block diagram illustrating a configuration of a communication device according to an exemplary embodiment of the present invention.

DESCRIPTION OF EXEMPLARY EMBODIMENTS

Hereinafter, an exemplary embodiment of the present invention will be described in detail with reference to the attached drawings. A detailed description of the present invention to be described hereinafter together with the attached drawings describes an exemplary embodiment of the present invention and does not represent a sole embodiment in which the present invention may be executed. The following detailed description includes detailed contents in order to provide complete understanding of the present invention. However, a person of ordinary skill in the art knows that the present invention may be executed without such detailed contents.

In several cases, in order to avoid a concept of the present invention from being ambiguous, well-known structures and devices may be omitted or a core function of each structure and device may be mainly shown in a block diagram form.

In this specification, a base station has a meaning as a terminal node of a network that directly communicates with a terminal. In this document, a specific operation described as performed by a base station may be performed by an upper node of the base station in some case. That is, in a network configured with a plurality of network nodes including the base station, it will become apparent that various operations performed for communication with the terminal may be performed by a base station or other network nodes other than the base station. A Base Station (BS) may be replaced with a term such as a fixed station, a Node B, an evolved-NodeB (eNB), a base transceiver system (BTS), and an Access Point (AP). Further, the 'terminal' may be fixed or may have mobility and may be replaced with a term such as a User Equipment (UE), a Mobile Station (MS), a User terminal (UT), a Mobile Subscriber Station (MSS), a Subscriber Station (SS), an Advanced Mobile Station (AMS), a Wireless terminal (WT), a Machine-Type Communication (MTC) device, a Machine-to-Machine (M2M) device, and a Device-to-Device (D2D) device.

Hereinafter, a downlink (DL) means communication from the BS to the terminal, and an uplink (UL) means communication from the terminal to the base station. In the downlink, a transmitter may be a portion of the base station, and the receiver may be a portion of the terminal. In the uplink, the transmitter may be a portion of the terminal, and the receiver may be a portion of the base station.

Specific terms used in the following description are provided for understanding of the present invention, and use of such a specific term may be changed in other forms without deviating from the spirit and scope of the present invention.

The following technology may be used for various wireless access systems such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). The CDMA may be implemented with radio technology such as universal terrestrial radio access (UTRA) or CDMA2000. The TDMA may be implemented with radio technology such as global system for mobile communications (GSM)/general packet radio service (GPRS)/enhanced data rates for GSM evolution (EDGE). The OFDMA may be implemented with radio technology such as IEEE 802.11 (Wi-Fi), IEEE 802.16 (WiMAX), IEEE 802-20, and E-UTRA (evolved UTRA). The UTRA is a portion of a universal mobile telecommunications system (UMTS). 3rd generation partnership project (3GPP) long term evolution (LTE) is a portion of an evolved UMTS (E-UMTS) using E-UTRA and adapts OFDMA in a downlink and adapts SC-FDMA in an uplink. LTE-advanced (A) is innovation of 3GPP LTE.

Exemplary embodiments of the present invention may be supported by standard documents that describe at least one of IEEE 802, 3GPP, and 3GPP2, which are wireless access systems. That is, in exemplary embodiments of the present invention, steps or portions that are not described to clearly expose the spirit and scope of the present invention may be supported by the documents. Further, entire terms of this document may be described by the standard document.

For clear description, 3GPP LTE/LTE-A is mainly described, but a technical characteristic of the present invention is not limited thereto.

Terms that may be used in this document are defined as follows.

Universal Mobile Telecommunications System (UMTS): 3-Generation mobile communication technology based on Global System for Mobile Communication (GSM) and developed by 3GPP, Evolved Packet System (EPS): A network system configured with an Evolved Packet Core (EPC), which is a packet switched core network based on an Internet Protocol (IP) and an access network such as LTE and UTRAN. The EPS is a network of a form in which the UMTS is innovated.

NodeB: Base station of an UMTS network. The NodeB is installed outdoor and covers a macro cell.

eNodeB: Base station of an EPS network. The eNodeB is installed outdoor and covers a macro cell.

UE: User device. The UE may be referred to as a term such as a terminal, a Mobile Equipment (ME), and a Mobile Station (MS). Further, the UE may be a device that can carry such as a notebook computer, a mobile phone, a Personal Digital Assistant (PDA), a smart phone, and a multimedia device or may be a device that cannot carry such as a Personal Computer (PC) and a vehicle mounting device. In MTC related contents, the UE may indicate an MTC terminal.

IP Multimedia Subsystem (IMS): Subsystem that provides a multimedia service based on IP.

International Mobile Subscriber Identity (IMSI): Internationally uniquely allocated user identifier in a mobile communication network.

Public Land Mobile Network (PLMN): A network configured as an object to provide a mobile communication service to individuals. The PLMN may be divided and configured on an operator basis.

Non-Access Stratum (NAS): A functional layer for transmitting and receiving a traffic message and signaling between a terminal and a core network at UMTS and EPS protocol stacks. The NAS has a main function of supporting mobility of the terminal and supporting a session management procedure that establishes and maintains IP connection between the terminal and a PDN GW.

Hereinafter, the present invention will be described based on the defined terms.

System to which the Present Invention can be Applied

FIG. 1 illustrates an Evolved Packet System (EPS) to which the present invention can be applied.

A network structure diagram of FIG. 1 simply illustrates a structure of an EPS including an Evolved Packet Core (EPC).

An EPC is a core element of System Architecture Evolution (SAE) for enhancing a performance of 3GPP technologies. The SAE corresponds to a research subject that determines a network structure that supports mobility between various kinds of networks. The SAE has a target that provides an optimized packet-based system that supports various wireless access technologies based on, for example, an IP and that provides more enhanced data transmission ability.

Specifically, the EPC is a core network of an IP mobile communication system for a 3GPP LTE system and may support a packet-based real time and non-real time service. In an existing mobile communication system (i.e., second generation or third generation mobile communication system), a function of a core network was implemented through two distinguished sub-domains of Circuit-Switched (CS) for voice and Packet-Switched (PS) for data. However, in an innovated 3GPP LTE system of the third generation mobile communication system, sub-domains of CS and PS were unified into a single IP domain. That is, in the 3GPP LTE system, connection between terminals having an IP capability may be formed through an IP-based base station (e.g., evolved Node B (eNodeB)), an EPC, an application domain (e.g., IMS). That is, the EPC is an essential structure in implementing an end-to-end IP service.

The EPC may include various constituent elements, and FIG. 1 illustrates a Serving Gateway (SGW) (or S-GW), a Packet Data Network Gateway (PDN GW) (or PGW or PGW), a Mobility Management Entity (MME), a Serving General Packet Radio Service (GPRS) Supporting Node (SGSN), and an enhanced Packet Data Gateway (ePDG) corresponding to a portion of the various constituent elements.

The SGW operates as a boundary point between a radio access network (RAN) and a core network and is an element that performs a function of maintaining a data path between the eNodeB and the PDN GW. Further, when the terminal moves over an area served by the eNodeB, the SGW performs a function of a local mobility anchor point. That is, for mobility within a Universal Mobile Telecommunications System (Evolved-UMTS) Terrestrial Radio Access Network defined after 3GPP release-8) (E-UTRAN), packets may be routed through the SGW. Further, the SGW may function as an anchor point for mobility with another 3GPP network (RAN defined before 3GPP release-8, for example, UTRAN or Global System for Mobile Communication (GSM)/Enhanced Data rates for Global Evolution (EDGE) Radio Access Network (GERAN)).

The PDN GW corresponds to a termination point of a data interface toward a packet data network. The PDN GW may support policy enforcement features, packet filtering, and charging support. Further, the PDN GW may perform an anchor point function for mobility management with an unreliable network such as a 3GPP network and a non-3GPP network (e.g., an Interworking Wireless Local Area Network (I-WLAN), a Code Division Multiple Access (CDMA) network or a reliable network such as a Wimax).

In an illustration of a network structure of FIG. 1, the SGW and the PDN GW are configured as a separate gateway, but two gateways may be implemented according to a single gateway configuration option.

The MME is an element that performs signaling and control functions for supporting access to network connection of the terminal, allocation of a network resource, tracking, paging, roaming, and handover. The MME controls control plane functions related to a subscriber and session management. The MME manages many eNodeBs and performs signaling for selection of a conventional gateway for handover of another 2G/3G network. Further, the MME performs a function of security procedures, terminal-to-network Session Handling, and idle terminal location management.

The SGSN handles entire packet data such as user mobility management and authentication of another 3GPP network (e.g., GPRS network).

The ePDG functions as a security node of an unreliable non-3GPP network (e.g., I-WLAN, WiFi hotspot).

Referring to FIG. 1, the UE having an IP capability may access to an IP service network (e.g., IMS) in which a provider (i.e., operator) provides via various elements within the EPC based on 3GPP access and non-3GPP access.

Further, FIG. 1 illustrates various reference points (e.g., S1-U, S1-MME). In the 3GPP system, a concept link that connects two functions existing at different functional entities of an E-UTRAN and an EPC is defined to a reference point. Table 1 represents a reference point of FIG. 1. In addition to an illustration of Table 1, various reference points may exist according to a network structure.

is a reference point that provides related control and mobility support between ePDG and PDN GW to a user plane.

FIG. 2 illustrates an example of a network structure of an evolved universal terrestrial radio access network (E-UTRAN) to which the present invention can be applied.

The E-UTRAN system is an innovated system of an existing UTRAN system and may be, for example, a 3GPP LTE/LTE-A system. The communication network is widely disposed to provide various communication services such as a voice (e.g., Voice over Internet Protocol (VoIP)) through IMS and packet data.

Referring to FIG. 2, the E-UMTS network includes an E-UTRAN, an EPC, and at least one UE. The E-UTRAN is configured with eNBs that provide control plane and user plane protocols to the UE, and the eNBs are connected through an X2 interface.

An X2 user plane interface (X2-U) is defined between the eNBs. The X2-U interface provides non-guaranteed delivery of a user plane packet data unit (PDU). An X2 control plane interface (X2-CP) is defined between two neighboring eNBs. The X2-CP performs a function of context transfer between the eNBs, the control of a user plane tunnel between a source eNB and a target eNB, transfer of a handover related message, and uplink load management.

The eNB is connected to the UE through a wireless interface and is connected to an Evolved Packet Core (EPC) through an S1 interface.

An S1 user plane interface (S1-U) is defined between the eNB and a serving gateway (S-GW). An S1 control plane interface (S1-MME) is defined between the eNB and a mobility management entity (MME). The S1 interface performs an Evolved Packet System (EPS) bearer service management function, a non-access stratum (NAS) signaling transport function, network sharing, and a MME load balancing function. The S1 interface supports many-to-many-relation between the eNB and the MME/S-GW.

The MME may perform various functions of NAS signaling security, Access Stratum (AS) security control, Core Network (CN) Inter-CN signaling for supporting mobility between 3GPP access networks, IDLE mode UE reach

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to the UE mobility and if the Serving GW needs to connect to a non-collocated PDN GW for the required PDN connectivity. |
| S11 | Reference point of the control plane protocol between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among reference points of FIG. 1, S2a and S2b correspond to a non-3GPP interface. S2a is a reference point that provides related control and mobility resource between a reliable non-3GPP access and PDN GW to a user plane. S2b ability (including execution and control of paging retransmission), Tracking Area Identity (TAI) management (for idle and active mode terminal), PDN GW and SGW selection, MME selection for handover in which the MME is changed, SGSN selection for handover to a 2G or 3G 3GPP access network, roaming, authentication, a bearer management function including dedicated bearer establishment, and Public Warning System (PWS) (including an Earthquake and Tsunami Warning System (ETWS) and Commercial Mobile Alert System (CMAS)) message transmission support.

FIG. 3 illustrates a structure of an E-UTRAN and an EPC in a wireless communication system to which the present invention can be applied.

Referring to FIG. 3, the eNB may perform a function of selection of a gateway (e.g., MME), routing to a gateway for radio resource control (RRC) activation, scheduling and transmission of a broadcast channel (BCH), dynamic resource allocation to the UE in an uplink and a downlink, and mobility control connection in an LTE ACTIVE state. As described above, a gateway within the EPC may perform a function of origination, LTE IDLE state management, ciphering of a user plane, a System Architecture Evolution (SAE) bearer control, and ciphering and integrity protection of NAS signaling.

FIG. 4 illustrates a radio interface protocol structure between an UE and an E-UTRAN in a wireless communication system to which the present invention can be applied.

FIG. 4A illustrates a wireless protocol structure of a control plane, and FIG. 4B illustrates a wireless protocol structure of a user plane.

Referring to FIG. 4, layers of a wireless interface protocol between the UE and the E-UTRAN may be divided into a first layer L1, a second layer L2, and a third layer L3 based on subordinate 3 layers of an open system interconnection (OSI) standard model widely known in the art of a communication system. The wireless interface protocol between the UE and the E-UTRAN is horizontally formed with a physical layer, a data link layer, and a network layer and is vertically divided into a protocol stack user plane for transmitting data information and a control plane, which is a protocol stack for transferring signaling.

The control plane is a transmitting path of control messages in which the UE and the network use to manage a call. The user plane means a path that transmits data, for example, voice data or Internet packet data generated in an application layer. Hereinafter, each layer of a control plane and a user plane of a wireless protocol will be described.

By using a physical channel, a physical layer (PHY), which is a first layer L1 provides an information transfer service to a superordinate layer. The physical layer is connected to a medium access control (MAC) layer located at a superordinate level through a transport channel, and data are transmitted between the MAC layer and the physical layer through the transport channel. The transport channels are classified according to a method and feature in which data are transmitted through a wireless interface. Data are transmitted between different physical layers and between a physical layer of a transmitting terminal and a physical layer of a receiving terminal through the physical channel. The physical layer is modulated with an orthogonal frequency division multiplexing (OFDM) method and uses a time and a frequency as a radio resource.

There are several physical control channels used in a physical layer. The physical downlink control channel (PDCCH) notifies the UE of resource allocation of a paging channel (PCH) and a downlink shared channel (DL-SCH) and hybrid automatic repeat request (HARQ) information related to an uplink shared channel (UL-SCH). Further, the PDCCH may transmit UL grant that notifies resource allocation of uplink transmission to the UE. A physical control format indicator channel (PDFICH) notifies the UE of the number of OFDM symbols using for PDCCHs and is transmitted to every subframe. A physical HARQ indicator channel (PHICH) transmits a HARQ acknowledge (ACK)/non-acknowledge (NACK) signal in response to uplink transmission. A physical uplink control channel (PUCCH) transmits uplink control information such as HARQ ACK/NACK, a scheduling request, and a channel quality indicator (CQI) of downlink transmission. The physical uplink shared channel (PUSCH) transmits an UL-SCH.

A MAC layer of the second layer L2 provides a service to a radio link control (RLC) layer, which is a superordinate layer through a logical channel. Further, the MAC layer includes a mapping function between the logical channel and the transport channel and a multiplexing/demultiplexing function to a transport block provided to a physical channel on a transport channel of a MAC service data unit (SDU) that belongs to the logical channel.

An RLC layer of the second layer L2 supports reliable data transmission. A function of the RLC layer includes concatenation, segmentation, and reassembly of an RLC SDU. In order to guarantee various quality of services (QoS) in which a radio bearer (RB) requires, the RLC layer provides three operation modes of a transparent mode (TM), an unacknowledged mode (UM), and an acknowledge mode (AM). An AM RLC provides error correction through an automatic repeat request (ARQ). When the MAC layer performs an RLC function, the RLC layer may be included as a function block of an MAC layer.

A packet data convergence protocol (PDCP) layer of the second layer L2 performs a transfer function of user data in a user plane and a header compression and ciphering function. In order to efficiently transmit an Internet protocol (IP) packet such as Internet protocol version 4 (IPv4) or Internet protocol version 6 (IPv6) through a wireless interface having a small bandwidth, a header compression function means a function of reducing an IP packet header size having a relatively large size and that contains unnecessary control information. A function of a PDCP layer in the control plane includes transfer of control plane data and ciphering/integrity protection.

A radio resource control (RRC) layer located at a lowermost portion of a third layer L3 is defined to only a control plane. The RRC layer performs a function of controlling a radio resource between the UE and the network. For this reason, the UE and the network exchange an RRC message through the RRC layer. The RRC layer controls a logical channel, a transport channel, and a physical channel in relation to a configuration, a re-configuration, and release of radio bearers. For data transmission between the UE and the network, the radio bearer means a logical path provided by the second layer L2. A configuration of a radio bearer means prescription of a feature of a wireless protocol layer and a channel in order to provide a specific service and a configuration of each detailed parameter and operation method. The radio bearer may be again divided into two of signaling RB (SRB) and data RB (DRB). The SRB is used as a path that transmits an RRC message at the control plane, and the DRB is used as a path that transmits user data at the user plane.

A non-access stratum (NAS) layer located as a superordinate layer of the RRC layer performs a function of session management and mobility management.

One cell constituting a base station is set to one of bandwidths such as 1.25, 2.5, 5, 10, and 20 Mhz to provide a downlink or uplink transmission service to several UEs. Different cells may be set to provide different bandwidths.

A downlink transport channel that transmits data from the network to the UE includes a broadcast channel (BCH) that transmits system information, a PCH that transmits a paging message, and a DL-SCH that transmits user traffic or a control message. Traffic or a control message of downlink multicast or a broadcasting service may be transmitted through the DL-SCH or through a separate downlink multicast channel (MCH). An uplink transport channel that transmits data from the UE to the network includes a random access channel (RACH) that transmits an initial control message and an uplink shared channel (UL-SCH) that transmits user traffic or a control message.

The logical channel is a superordinate channel of the transport channel and is mapped to the transport channel. The logical channel may be divided into a control channel for transfer of control area information and a traffic channel for transfer of user area information. The control channel includes a broadcast control channel (BCCH), a paging control channel (PCCH), a common control channel (CCCH), a dedicated control channel (DCCH), and a multicast control channel (MCCH). The traffic channel includes a dedicated traffic channel (DTCH) and a multicast traffic channel (MTCH). The PCCH is a downlink channel that transfers paging information and is used when a network does not know a cell to which the UE belongs. The CCCH is used by the UE that does not have RRC connection to the network. The MCCH is a point-to-multipoint downlink channel used for transferring Multimedia Broadcast and Multicast Service (MBMS) control information from the network to the UE. The DCCH is a point-to-point bi-directional channel used by the UE having RRC connection that transfers dedicated control information between the UE and the network. The DTCH is a point-to-point channel used for only one UE in order to transfer user information that can exist at an uplink and a downlink. The MTCH is a point-to-multipoint downlink channel in order to transfer traffic data from the network to the UE.

In uplink connection between the logical channel and the transport channel, the DCCH may be mapped to the UL-SCH, the DTCH may be mapped to the UL-SCH, and the CCCH may be mapped to the UL-SCH. In downlink connection between the logical channel and the transport channel, the BCCH may be mapped to the BCH or the DL-SCH, the PCCH may be mapped to the PCH, the DCCH may be mapped to the DL-SCH, the DTCH may be mapped to the DL-SCH, the MCCH may be mapped to the MCH, and the MTCH may be mapped to the MCH.

FIG. 5 illustrates a structure of a physical channel in a wireless communication system to which the present invention can be applied.

Referring to FIG. 5, the physical channel transfers signaling and data through a radio resource configured with at least one subcarrier in a frequency domain and at least one symbol in a time domain.

One subframe having a length 1.0 ms is configured with a plurality of symbols. Specific symbol(s) (e.g., a first symbol of the subframe) of the subframe may be used for a PDCCH. The PDCCH transmits information (e.g., resource block) about a dynamically allocated resource and a Modulation and Coding Scheme (MCS).

Random Access Procedure

Hereinafter, a random access procedure providing in an LTE/LTE-A system will be described.

Because the UE does not have RRC Connection to the base station, when the UE performs initial access in an RRC idle state, the random access procedure is performed when performing an RRC connection re-establishment procedure.

In the LTE/LTE-A system, in a process of selecting a random access preamble (RACH preamble), the UE provides both a contention based random access procedure that randomly selects and uses one preamble and a non-contention based random access procedure in which a base station allocates to only a specific UE within a specific set.

FIG. 6 illustrates a contention based random access procedure in a wireless communication system to which the present invention can be applied.

(1) Msg 1 (Message 1)

First, the UE randomly selects one random access preamble (RACH preamble) at a set of random access preambles instructed through system information or a handover command and selects and transmits a physical RACH (PRACH) resource that can transmit the random access preamble.

The base station, having received a random access preamble from the UE decodes the preamble and acquires an RA-RNTI. The RA-RNTI related to the PRACH in which the random access preamble is transmitted is determined according to a time-frequency resource of a random access preamble in which a corresponding UE transmits.

(2) Msg 2 (Message 2)

The base station transmits a random access response addressed with the RA-RNTI acquired through a preamble on a message 1 to the UE. The random access response may include an RA preamble index/identifier, UL grant that notifies an uplink wireless resource, a Temporary Cell RNTI (TC-RNTI), and a time alignment command (TAC). The TAC is information that addresses a time synchronization value in which the base station sends to maintain uplink time alignment to the UE. The UE updates uplink transmission timing using the time synchronization value. When the UE updates time synchronization, the UE starts or restarts a time alignment timer. UL grant includes uplink resource allocation and transmit power command (TPC) used for transmission of a scheduling message (a message 3) to be described later. The TPC is used in determination of transmission power for a scheduled PUSCH.

After the UE transmits a random access preamble, the base station attempts reception of a random access response thereof within a random access response window addressed through system information or handover command, detects a masked PDCCH with the RA-RNTI corresponding to the PRACH, and receives a PDSCH addressed by the detected PDCCH. Random access response information may be transmitted in a form of a MAC packet data unit (MAC PDU), and the MAC PDU may be transferred through the PDSCH.

When the UE successfully receives a random access response having the same random access preamble index/identifier as that of a random access preamble transmitted to the base station, the UE stops monitoring of a random access response. However, until a random access response window is terminated, when the UE does not receive a random access response message or when the UE does not receive an effective random access response having the same random access preamble index as that of a random access preamble transmitted to the base station, it is regarded that reception of the random access response is failed and then the UE may retransmit the preamble.

(3) Msg 3 (Message 3)

When the UE receives an effective random access response, the UE processes each information included in the random access response. That is, the UE applies TAC and stores a TC-RNTI. Further, the UE transmits data stored at a buffer of the UE or newly generated data to the base station using UL grant.

In initial access of the UE, an RRC Connection Request generated in the RRC layer and transferred through the CCCH may be included and transmitted in the message 3, and in an RRC connection re-establishment procedure, an RRC Connection Re-establishment Request generated at the RRC layer and transferred through the CCCH may be included and transmitted in the message 3. Further, the message 3 may include a NAS access request message.

The message 3 should include an identifier of the UE. There are two methods of including an identifier of the UE. In a first method, when the UE already has an effective cell identifier (C-RNTI) allocated from a corresponding cell before the random access procedure, the UE transmits a cell identifier thereof through an uplink transmitting signal corresponding to the UL grant. However, when the UE does not have an effective cell identifier (C-RNTI) allocated from a corresponding cell before the random access procedure, the UE transmits a message 3 including a unique identifier (e.g., S-TMSI or random number) thereof. The unique identifier is generally longer than the C-RNTI.

When the UE transmits data corresponding to the UL grant, the UE starts a contention resolution timer.

(4) Msg 4 (Message 4)

When the base station receives the C-RNTI of a corresponding UE through the message 3 from the UE, the base station transmits a message 4 to the UE using the received C-RNTI. However, when the base station receives the unique identifier (i.e., S-TMSI or random number) from the UE through the message 3, the base station transmits the message 4 to the UE using a TC-RNTI allocated to the corresponding UE in a random access response. For example, the message 4 may include RRC Connection Setup.

The UE transmits data including an identifier thereof through UL grant included in the random access response and awaits an instruction of the base station in order to resolute contention. That is, in order to receive a specific message, the UE attempts reception of a PDCCH. There are two methods of receiving the PDCCH. As described above, in the message 3 transmitted to correspond to the UL grant, when an identifier thereof is a C-RNTI, the UE attempts reception of the PDCCH using the C-RNTI, and when the identifier is an unique identifier (i.e., S-TMSI or random number), the UE attempts reception of the PDCCH using a TC-RNTI included in the random access response. Thereafter, in the former case, before the contention resolution timer is terminated, when the UE receives the PDCCH through the C-RNTI thereof, the UE determines that a random access procedure has been normally performed and terminates the random access procedure. In the latter case, before the contention resolution timer is terminated, when the UE receives the PDCCH through the TC-RNTI, the UE determines data in which a PDSCH addressed by the PDCCH transfers. When a unique identifier thereof is included in the data, the UE determines that a random access procedure has been normally performed and terminates the random access procedure. The UE acquires a C-RNTI through the message 4 and the UE and the network transmit and receive a dedicated message using the C-RNTI.

In an operation in a non-contention based random access process, a random access procedure is terminated with only first message transmission and second message transmission unlike a contention-based random access process of FIG. 6. However, before the UE transmits a random access preamble to the base station with the message 1, the UE receives allocation of the random access preamble from the base station, transmits the allocated random access preamble to the base station with the message 1, and receives a random access response from the base station and thus the random access procedure is terminated.

Scheduling Request

The Scheduling Request (SR) is used for requesting uplink shared channel (UL-SCH) resources for new transmission.

When an SR is triggered, it shall be considered as pending until it is cancelled. All pending SR(s) shall be cancelled and 'sr-ProhibitTimer' shall be stopped when a MAC packet data unit (PDU) is assembled and this PDU includes a Buffer Status Report (BSR) which contains buffer status up to (and including) the last event that triggered a BSR, or, if all pending SR(s) are triggered by Sidelink BSR (i.e. BSR for device-to-device (D2D) link or PC5), when a MAC PDU is assembled and this PDU includes a Sidelink BSR which contains buffer status up to (and including) the last event that triggered a Sidelink BSR, or, if all pending SR(s) are triggered by Sidelink BSR, when upper layers configure autonomous resource selection, or when the UL grant(s) can accommodate all pending data available for transmission.

If an SR is triggered and there is no other SR pending, the MAC entity shall set the SR_COUNTER to 0.

As long as one SR is pending, the MAC entity shall for each TTI:
  if no UL-SCH resources are available for a transmission in this TTI:
    if the MAC entity has no valid PUCCH resource for SR configured in any Transmission Time Interval (TTI): initiate a Random Access procedure on the Primary Secondary Cell (SpCell) and cancel all pending SRs;
    else if the MAC entity has at least one valid PUCCH resource for SR configured for this TTI and if this TTI is not part of a measurement gap or Sidelink Discovery Gap for Transmission and if 'sr-ProhibitTimer' is not running:
      if SR_COUNTER <'dsr-TransMax':
      increment SR_COUNTER by 1; instruct the physical layer to signal the SR on one valid PUCCH resource for SR; start the 'sr-ProhibitTimer'.
      else:
      notify RRC to release PUCCH for all serving cells; notify RRC to release SRS for all serving cells; clear any configured downlink assignments and uplink grants; initiate a Random Access procedure on the SpCell and cancel all pending SRs.

The UE may perform the selection of which valid PUCCH resource for SR to signal SR on when the MAC entity has more than one valid PUCCH resource for SR in one TTI.

SR_COUNTER is incremented for each SR bundle. sr-ProhibitTimer is started in the first TTI of an SR bundle.

Buffer Status Reporting (BSR)

The Buffer Status reporting procedure is used to provide the serving eNB with information about the amount of data available for transmission in the UL buffers associated with the MAC entity. RRC controls BSR reporting by configuring the three timers 'periodicBSR-Timer', 'retxBSR-Timer' and 'logicalChannelSR-ProhibitTimer' and by, for each logical channel, optionally signalling 'logicalChannelGroup' which allocates the logical channel to an Logical Channel Group (LCG).

For the Buffer Status reporting procedure, the MAC entity shall consider all radio bearers which are not suspended and may consider radio bearers which are suspended.

For NB-IoT the Long BSR is not supported and all logical channels belong to one LCG.

A Buffer Status Report (BSR) shall be triggered if any of the following events occur:
- UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";
- UL resources are allocated and number of padding bits is equal to or larger than the size of the Buffer Status Report MAC control element plus its subheader, in which case the BSR is referred below to as "Padding BSR";
- 'retxBSR-Timer' expires and the MAC entity has data available for transmission for any of the logical channels which belong to a LCG, in which case the BSR is referred below to as "Regular BSR";
- 'periodicBSR-Timer' expires, in which case the BSR is referred below to as "Periodic BSR".

For Regular BSR:
if the BSR is triggered due to data becoming available for transmission for a logical channel for which 'logicalChannelSR-ProhibitTimer' is configured by upper layers:
start or restart the 'logicalChannelSR-ProhibitTimer';
else:
if running, stop the 'logicalChannelSR-ProhibitTimer'.

For Regular and Periodic BSR:
if more than one LCG has data available for transmission in the TTI where the BSR is transmitted: report Long BSR;
else report Short BSR.

For Padding BSR:
if the number of padding bits is equal to or larger than the size of the Short BSR plus its subheader but smaller than the size of the Long BSR plus its subheader:
if more than one LCG has data available for transmission in the TTI where the BSR is transmitted: report Truncated BSR of the LCG with the highest priority logical channel with data available for transmission;
else report Short BSR.
else if the number of padding bits is equal to or larger than the size of the Long BSR plus its subheader, report Long BSR.

If the Buffer Status reporting procedure determines that at least one BSR has been triggered and not cancelled:
if the MAC entity has UL resources allocated for new transmission for this TTI:
instruct the Multiplexing and Assembly procedure to generate the BSR MAC control element(s);
start or restart 'periodicBSR-Timer' except when all the generated BSRs are Truncated BSRs;
start or restart 'retxBSR-Timer'.
else if a Regular BSR has been triggered and 'logicalChannelSR-ProhibitTimer' is not running:
if an uplink grant is not configured or the Regular BSR was not triggered due to data becoming available for transmission for a logical channel for which logical channel SR masking ('logicalChannelSR-Mask') is setup by upper layers:
a Scheduling Request shall be triggered.

A MAC PDU shall contain at most one MAC BSR control element, even when multiple events trigger a BSR by the time a BSR can be transmitted in which case the Regular BSR and the Periodic BSR shall have precedence over the padding BSR.

The MAC entity shall restart retxBSR-Timer upon indication of a grant for transmission of new data on any UL-SCH.

All triggered BSRs shall be cancelled in case the UL grant(s) in this TTI can accommodate all pending data available for transmission but is not sufficient to additionally accommodate the BSR MAC control element plus its subheader. All triggered BSRs shall be cancelled when a BSR is included in a MAC PDU for transmission.

The MAC entity shall transmit at most one Regular/Periodic BSR in a TTI. If the MAC entity is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

A Padding BSR is not allowed to cancel a triggered Regular/Periodic BSR, except for NB-IoT. A Padding BSR is triggered for a specific MAC PDU only and the trigger is cancelled when this MAC PDU has been built.

Sidelink Buffer Status Reporting

The sidelink Buffer Status reporting procedure is used to provide the serving eNB with information about the amount of sidelink data available for transmission in the Sidelink (SL) buffers associated with the MAC entity. RRC controls BSR reporting for the sidelink by configuring the two timers 'periodic-BSR-TimerSL' and 'retx-BSR-TimerSL'. Each sidelink logical channel belongs to a Proximity Service (ProSe) Destination. Each sidelink logical channel is allocated to an LCG depending on the priority of the sidelink logical channel and the mapping between LCG ID and priority which is provided by upper layers in 'logicalChGroupInfoList'. LCG is defined per ProSe Destination.

A sidelink Buffer Status Report (BSR) shall be triggered if any of the following events occur:
if the MAC entity has a configured Sidelink-Radio Network Temporary Identifier (SL-RNTI):
SL data, for a sidelink logical channel of a ProSe Destination, becomes available for transmission in the RLC entity or in the PDCP entity and either the data belongs to a sidelink logical channel with higher priority than the priorities of the sidelink logical channels which belong to any LCG belonging to the same ProSe Destination and for which data is already available for transmission, or there is currently no data available for transmission for any of the sidelink logical channels belonging to the same ProSe Destination, in which case the Sidelink BSR is referred below to as "Regular Sidelink BSR";
UL resources are allocated and number of padding bits remaining after a Padding BSR has been triggered is equal to or larger than the size of the Sidelink BSR MAC control element containing the buffer status for at least one LCG of a ProSe Destination plus its subheader, in which case the Sidelink BSR is referred below to as "Padding Sidelink BSR";

'retx-BSR-TimerSL' expires and the MAC entity has data available for transmission for any of the sidelink logical channels, in which case the Sidelink BSR is referred below to as "Regular Sidelink BSR";

'periodic-BSR-TimerSL' expires, in which case the Sidelink BSR is referred below to as "Periodic Sidelink BSR";

else:

An SL-RNTI is configured by upper layers and SL data is available for transmission in the RLC entity or in the PDCP entity, in which case the Sidelink BSR is referred below to as "Regular Sidelink BSR".

For Regular and Periodic Sidelink BSR:

if the number of bits in the UL grant is equal to or larger than the size of a Sidelink BSR containing buffer status for all LCGs having data available for transmission plus its subheader:

report Sidelink BSR containing buffer status for all LCGs having data available for transmission;

else report Truncated Sidelink BSR containing buffer status for as many LCGs having data available for transmission as possible, taking the number of bits in the UL grant into consideration.

For Padding Sidelink BSR:

if the number of padding bits remaining after a Padding BSR has been triggered is equal to or larger than the size of a Sidelink BSR containing buffer status for all LCGs having data available for transmission plus its subheader:

report Sidelink BSR containing buffer status for all LCGs having data available for transmission;

else report Truncated Sidelink BSR containing buffer status for as many LCGs having data available for transmission as possible, taking the number of bits in the UL grant into consideration.

If the Buffer Status reporting procedure determines that at least one Sidelink BSR has been triggered and not cancelled:

if the MAC entity has UL resources allocated for new transmission for this TTI and the allocated UL resources can accommodate a Sidelink BSR MAC control element plus its subheader as a result of logical channel prioritization:

instruct the Multiplexing and Assembly procedure to generate the Sidelink BSR MAC control element(s);

start or restart 'periodic-BSR-TimerSL' except when all the generated Sidelink BSRs are Truncated Sidelink BSRs;

start or restart 'retx-BSR-TimerSL';

else if a Regular Sidelink BSR has been triggered:

if an uplink grant is not configured:

a Scheduling Request shall be triggered.

A MAC PDU shall contain at most one Sidelink BSR MAC control element, even when multiple events trigger a Sidelink BSR by the time a Sidelink BSR can be transmitted in which case the Regular Sidelink BSR and the Periodic Sidelink BSR shall have precedence over the padding Sidelink BSR.

The MAC entity shall restart 'retx-BSR-TimerSL' upon reception of an SL grant.

All triggered regular Sidelink BSRs shall be cancelled in case the remaining configured SL grant(s) valid for this Sidelink Control (SC) Period can accommodate all pending data available for transmission in sidelink communication or in case the remaining configured SL grant(s) valid can accommodate all pending data available for transmission in Vehicle-to-Everything (V2X) sidelink communication. All triggered Sidelink BSRs shall be cancelled in case the MAC entity has no data available for transmission for any of the sidelink logical channels. All triggered Sidelink BSRs shall be cancelled when a Sidelink BSR (except for Truncated Sidelink BSR) is included in a MAC PDU for transmission. All triggered Sidelink BSRs shall be cancelled, and 'retx-BSR-TimerSL' and 'periodic-BSR-TimerSL' shall be stopped, when upper layers configure autonomous resource selection.

The MAC entity shall transmit at most one Regular/Periodic Sidelink BSR in a TTI. If the MAC entity is requested to transmit multiple MAC PDUs in a TTI, it may include a padding Sidelink BSR in any of the MAC PDUs which do not contain a Regular/Periodic Sidelink BSR.

All Sidelink BSRs transmitted in a TTI always reflect the buffer status after all MAC PDUs have been built for this TTI. Each LCG shall report at the most one buffer status value per TTI and this value shall be reported in all Sidelink BSRs reporting buffer status for this LCG.

A Padding Sidelink BSR is not allowed to cancel a triggered Regular/Periodic Sidelink BSR. A Padding Sidelink BSR is triggered for a specific MAC PDU only and the trigger is cancelled when this MAC PDU has been built.

Buffer Status Report MAC Control Element

FIG. 7 illustrates a structure of Buffer Status Report MAC Control Element in a wireless communication system to which the present invention can be applied.

FIG. 7(a) illustrates Short BSR and Truncated BSR MAC control element, and FIG. 7(b) illustrates Long BSR MAC control element.

Buffer Status Report (BSR) MAC control elements consist of either:

Short BSR and Truncated BSR format: one LCG Identifier (ID) field and one corresponding Buffer Size field (FIG. 7(a)); or Long BSR format: four Buffer Size fields, corresponding to LCG IDs #0 through #3 (FIG. 7(b)).

The BSR formats are identified by MAC PDU subheaders with Logical Channel Identifiers (LCIDs).

The fields LCG ID and Buffer Size are defined as follow:

LCG ID: The Logical Channel Group ID field identifies the group of logical channel(s) which buffer status is being reported. The length of the field is 2 bits;

Buffer Size: The Buffer Size field identifies the total amount of data available across all logical channels of a logical channel group after all MAC PDUs for the TTI have been built. The amount of data is indicated in number of bytes. It shall include all data that is available for transmission in the RLC layer and in the PDCP layer. The size of the RLC and MAC headers are not considered in the buffer size computation. The length of this field is 6 bits. If 'extendedBSR-Sizes' is not configured, the values taken by the Buffer Size field are shown in Table 2. If 'extendedBSR-Sizes' is configured, the values taken by the Buffer Size field are shown in Table 3.

Table 2 represents Buffer size levels for BSR.

TABLE 2

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |

TABLE 2-continued

| Index | Buffer Size (BS) value [bytes] |
|---|---|
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

Table 3 represents Extended Buffer size levels for BSR.

TABLE 3

| Index | Buffer Size (BS) value [bytes] |
|---|---|
| 0 | BS = 0 |
| 1 | 0 < BS <= 10 |
| 2 | 10 < BS <= 13 |
| 3 | 13 < BS <= 16 |
| 4 | 16 < BS <= 19 |
| 5 | 19 < BS <= 23 |
| 6 | 23 < BS <= 29 |
| 7 | 29 < BS <= 35 |
| 8 | 35 < BS <= 43 |

TABLE 3-continued

| Index | Buffer Size (BS) value [bytes] |
|---|---|
| 9 | 43 < BS <= 53 |
| 10 | 53 < BS <= 65 |
| 11 | 65 < BS <= 80 |
| 12 | 80 < BS <= 98 |
| 13 | 98 < BS <= 120 |
| 14 | 120 < BS <= 147 |
| 15 | 147 < BS <= 181 |
| 16 | 181 < BS <= 223 |
| 17 | 223 < BS <= 274 |
| 18 | 274 < BS <= 337 |
| 19 | 337 < BS <= 414 |
| 20 | 414 < BS <= 509 |
| 21 | 509 < BS <= 625 |
| 22 | 625 < BS <= 769 |
| 23 | 769 < BS <= 945 |
| 24 | 945 < BS <= 1162 |
| 25 | 1162 < BS <= 1429 |
| 26 | 1429 < BS <= 1757 |
| 27 | 1757 < BS <= 2161 |
| 28 | 2161 < BS <= 2657 |
| 29 | 2657 < BS <= 3267 |
| 30 | 3267 < BS <= 4017 |
| 31 | 4017 < BS <= 4940 |
| 32 | 4940 < BS <= 6074 |
| 33 | 6074 < BS <= 7469 |
| 34 | 7469 < BS <= 9185 |
| 35 | 9185 < BS <= 11294 |
| 36 | 11294 < BS <= 13888 |
| 37 | 13888 < BS <= 17077 |
| 38 | 17077 < BS <= 20999 |
| 39 | 20999 < BS <= 25822 |
| 40 | 25822 < BS <= 31752 |
| 41 | 31752 < BS <= 39045 |
| 42 | 39045 < BS <= 48012 |
| 43 | 48012 < BS <= 59039 |
| 44 | 59039 < BS <= 72598 |
| 45 | 72598 < BS <= 89272 |
| 46 | 89272 < BS <= 109774 |
| 47 | 109774 < BS <= 134986 |
| 48 | 134986 < BS <= 165989 |
| 49 | 165989 < BS <= 204111 |
| 50 | 204111 < BS <= 250990 |
| 51 | 250990 < BS <= 308634 |
| 52 | 308634 < BS <= 379519 |
| 53 | 379519 < BS <= 466683 |
| 54 | 466683 < BS <= 573866 |
| 55 | 573866 < BS <= 705666 |
| 56 | 705666 < BS <= 867737 |
| 57 | 867737 < BS <= 1067031 |
| 58 | 1067031 < BS <= 1312097 |
| 59 | 1312097 < BS <= 1613447 |
| 60 | 1613447 < BS <= 1984009 |
| 61 | 1984009 < BS <= 2439678 |
| 62 | 2439678 < BS <= 3000000 |
| 63 | BS > 3000000 |

Sidelink Buffer Status Report MAC Control Element

FIG. 8 illustrates a structure of Sidelink Buffer Status Report MAC Control Element in a wireless communication system to which the present invention can be applied.

FIG. 8(a) illustrates Sidelink BSR and Truncated Sidelink BSR MAC control element for even N, and FIG. 8(b) illustrates Sidelink BSR and Truncated Sidelink BSR MAC control element for odd N.

Sidelink BSR and Truncated Sidelink BSR MAC control elements consist of one Destination Index field, one LCG ID field and one corresponding Buffer Size field per reported target group.

The Sidelink BSR MAC control elements are identified by MAC PDU subheaders with LCIDs. They have variable sizes.

For each included group, the fields are defined as follows (FIG. 8(a) and FIG. 8(b):
  Destination Index: The Destination Index field identifies the ProSe Destination. The length of this field is 4 bits.

The value is set to the index of the destination reported in 'destinationInfoList' and if multiple such lists are reported, the value is indexed sequentially across all the lists in the same order;

LCG ID: The Logical Channel Group ID field identifies the group of logical channel(s) which buffer status is being reported. The length of the field is 2 bits;

Buffer Size: The Buffer Size field identifies the total amount of data available across all logical channels of a LCG of a ProSe Destination after all MAC PDUs for the TTI have been built. The amount of data is indicated in number of bytes. It shall include all data that is available for transmission in the RLC layer and in the PDCP layer. The size of the RLC and MAC headers are not considered in the buffer size computation. The length of this field is 6 bits. The values taken by the Buffer Size field are shown in Table 2;

R: Reserved bit, set to "0".

Buffer Sizes of LCGs are included in decreasing order of the highest priority of the sidelink logical channel belonging to the LCG irrespective of the value of the Destination Index field.

D2D Communication

Hereinafter, the D2D communication will be described in more detail.

The D2D communication may operate in the coverage and out of the coverage. A link used for the D2D communication (UE-to-UE direct communication) may be referred to as D2D link, direct link, or sidelink, but hereinafter, the link used for the D2D communication will be collectively called and described as the sidelink for easy description.

Sidelink transmission may operate in an uplink spectrum in the case of FDD and operate in an uplink (alternatively, downlink) subframe in the case of TDD. Time division multiplexing (TDM) may be used for multiplexing the sidelink transmission and uplink transmission.

The sidelink transmission and the uplink transmissions do not simultaneously occur. The sidelink subframe partially or totally overlapped with the uplink subframe or UpPTS used for the uplink transmission, the sidelink transmission does not occur. Further, sidelink transmission and reception do not also simultaneously occur.

In the case of a structure of a physical resource used for the sidelink transmission, a structure of an uplink physical resource may be similarly used. However, a last symbol of the sidelink subframe is constituted by a guard period not to be used for the sidelink transmission.

The sidelink subframe may be configured by an extended CP or a normal CP.

The D2D communication may be largely divided into discovery, direct communication, and synchronization.

1) Discovery

The D2D discovery may be applied in the network coverage (including Inter-cell and Intra-cell). In inter-cell discovery, both synchronous and asynchronous cell deployments may be considered. The D2D discovery may be used for various commercial purposes including advertisement, coupon issue, friend finding, and the like for a terminal within a proximate area.

When UE 1 plays a role of transmitting a discovery message, UE 1 transmits the discovery message and UE 2 receives the discovery message. Transmission and reception roles of UE 1 and UE 2 may be exchanged with each other. The discovery message transmitted from UE 1 may be received by one or more UE(s) such as UE 2.

The discovery message may include a single MAC PDU and herein, the single MAC PDU may include a UE identifier (ID) and an application ID.

As a channel for transmitting the discovery message, a physical sidelink discovery channel (PDSCH) may be defined. As a structure of the PDSCH, a PUSCH structure may be reused.

As a resource allocation method for the D2D discovery, two types (Type 1 and Type 2) may be used.

In the case of Type 1, the base station may allocate a resource for transmitting the discovery message by a non-UE specific scheme.

In detail, a radio resource pool for discovery transmission and reception constituted by a plurality of subframe sets and a plurality of resource block sets is allocated within a specific period (hereinafter, referred to as 'discovery period') and discovery transmission UE arbitrarily selects a specific resource in the radio resource pool and thereafter, transmits the discovery message.

The periodic discovery resource pool may be allocated for transmitting a discovery signal by a semi-static scheme. Configuration information of the discovery resource pool for the discovery transmission includes the discovery period, subframe set and resource block set information which may be used for transmitting the discovery signal within the discovery period, and the like. The configuration information of the discovery resource pool may be transmitted to the UE by high layer signaling. In the case of in-coverage UE, the discovery resource pool for the discovery transmission may be configured by the base station and notified to the UE by using RRC signaling (e.g., a system information block (SIB)).

The discovery resource pool allocated for the discovery within one discovery period as a time-frequency resource block having the same size may be multiplexed by TDM and/or FDM and the time-frequency resource block having the same size may be referred to as 'discovery resource'. The discovery resource may be divided by the unit of one subframe and include two physical resource blocks (PRBs) per slot in each subframe. One discovery resource may be used for transmitting a discovery MAC PDU by one UE.

Further, the UE may repeatedly transmit the discovery signal within the discovery period for transmitting one transport block. The MAC PDU transmitted by one UE may be repeatedly (e.g., repeatedly four times) contiguously or non-contiguously within the discovery period (that is, the radio resource pool). The number of transmission times of the discovery signal for one transport block may be transmitted to the UE by the high layer signaling.

The UE may arbitrarily select a first discovery resource in a discovery resource set which may be used for repeated transmission of the MAC PDU and other discovery resources may be determined in association with the first discovery resource. For example, a predetermined pattern may be previously set and the next discovery resource may be determined according to the previously set pattern according to a position of the discovery resource which the UE first selects. Or, the UE may arbitrarily select each discovery resource in the discovery resource set which may be used for the repeated transmission of the MAC PDU.

In Type 2, the resource for transmitting the discover message is UE-specifically allocated. Type 2 is subdivided into Type 2A (Type-2A) and Type 2B (Type-2B). Type 2A is a scheme in which the base station allocates the resource every transmission instance of the discovery message within the discovery period and Type 2B is a scheme in which the base station allocates the resource by a semi-persistent scheme.

In the case of Type 2B, RRC_CONNECTED UE requests allocation of the resource for transmitting the D2D discovery message to the base station through the RRC signaling. In addition, the base station may allocate the resource through the RRC signaling. When the UE is transitioned to the RRC_IDLE state or when the base station withdraws the resource allocation through the RRC signaling, the UE release a transmission resource which is allocated most recently. As described above, in the case of Type 2B, the radio resource may be allocated by the RRC signaling and activation/deactivation of the radio resource allocated by the PDCCH may be determined.

The radio resource pool for receiving the discovery message may be configured by the base station and notified to the UE by using the RRC signaling (e.g., the system information block (SIB)).

The UE that receives the discovery message monitors both the discovery resource pools of Type 1 and Type 2 in order to receive the discovery message.

2) Direct Communication

An application area of the D2D direct communication includes even a network coverage edge-of-coverage area as well as network in-coverage and out-of-coverage areas. The D2D direct communication may be used for a purpose such as public safety, or the like.

When UE 1 plays a role of transmitting direct communication data, UE 1 transmits the direct communication data and UE 2 receives the direct communication data. Transmission and reception roles of UE 1 and UE 2 may be exchanged with each other. The direct communication transmission from UE 1 may be received by one or more UE(s) such as UE 2.

The D2D discovery and the D2D communication may not be associated with each other but independently defined. That is, in groupcast and broadcast direct communication, the D2D discovery is not required. As such, when the D2D discovery and the D2D direct communication are independently defined, the UEs need not recognize adjacent UE. In other words, in the case of the groupcast and broadcast direct communication, all receiving UEs in a group are not required to be proximate to each other.

As a channel for transmitting the D2D direct communication data, a physical sidelink shared channel (PSSCH) may be defined. Further, as a channel for transmitting control information (e.g., scheduling assignment (SA), a transmission format, and the like for transmitting the direct communication data) for the D2D direct communication, a physical sidelink control channel (PSCCH) may be defined. As the structures of the PSSCH and the PSCCH, the PUSCH structure may be reused.

As a resource allocation method for the D2D direct communication, two modes (mode 1 and mode 2) may be used.

Mode 1 represents a scheme in which the base station schedules a resource used for transmitting data or control information for the D2D direct communication to the UE. In the in-coverage, mode 1 is applied.

The base station configures the resource pool required for the D2D direct communication. Herein, the resource pool required for the D2D communication may be divided into a control information pool and a D2D data pool. When the base station schedules control information and D2D data transmission resources within a pool configured for transmitting D2D UE by using the PDCCH or ePDCCH, the transmitting D2D UE transmits control information and D2D data by using an allocated resource.

The transmitting UE requests a transmission resource to the base station and the base station schedules resources for transmitting the control information and the D2D direct communication data. That is, in the case of mode 1, the transmitting UE needs to be in the RRC_CONNECTED state in order to perform the D2D direct communication. The transmitting UE transmits the scheduling request to the base station and thereafter, the buffer status report (BSR) procedure is performed so that the base station determines the quantity of resources requested by the transmitting UE.

When receiving UEs monitor the control information pool and decodes control information associated therewith, the receiving UEs may selectively decode D2D data transmission associated with the corresponding control information. The receiving UE may not decode the D2D data pool according to a control information decoding result.

Mode 2 represents a scheme in which the UE arbitrarily selects a specific resource in the resource pool in order to transmit data or control information for the D2D direct communication. In the out-of-coverage and/or edge-of-coverage, mode 2 is applied.

In mode 2, the resource pool for transmitting the control information and/or the resource pool for transmitting the D2D direct communication data may be pre-configured or semi-statically configured. The UE receives the configured resource pool (a time and a frequency) and selects the resource for the D2D communication transmission. That is, the UE may select the resource for transmitting the control information in the control information resource pool in order to transmit the control information. Further, the UE may select the resource in the data resource pool in order to transmit the D2D direct communication data.

In D2D broadcast communication, the control information is transmitted by a broadcasting UE. The control information indicates explicitly and/or implicitly a position of a resource for data reception in association with the physical channel (that is, PSSCH) transporting the D2D direct communication data.

3) Synchronization

A D2D synchronization signal/sequence (D2DSS) may be used for the UE to acquire time-frequency synchronization. In particular, since the control of the base station is impossible out of the network coverage, a new signal and a new procedure for establishing UE-to-UE synchronization may be defined. The D2D synchronization signal/sequence (D2DSS) may be referred to as a sidelink synchronization signal.

A UE that periodically transmits the D2D synchronization signal/sequence (D2DSS) may be referred to as a D2D synchronization source or a sidelink synchronization source. When the D2D synchronization source is the base station, a structure of the D2D synchronization signal/sequence (D2DSS) may be the same as the PSS/SSS. When the D2D synchronization source is not the base station (for example, the UE or a global navigation satellite system (GNSS)), the structure of the D2D synchronization signal/sequence (D2DSS) may be newly defined.

The D2D synchronization signal/sequence (D2DSS) is periodically transmitted with a period which is not smaller than 40 ms. Each UE may have multiple physical-layer D2D synchronization identities. The physical-layer D2D synchronization identity may be referred to as a physical-layer sidelink synchronization identity or just referred to as a D2D synchronization identity.

The D2D synchronization signal/sequence (D2DSS) includes a D2D primary synchronization signal/sequence and a D2D secondary synchronization signal/sequence. The D2D primary synchronization signal/sequence and the D2D secondary synchronization signal/sequence may be referred to as a primary sidelink synchronization signal and a secondary sidelink synchronization signal, respectively.

Before transmitting the D2D synchronization signal/sequence (D2DSS), the UE may first search the D2D synchronization source. In addition, when the D2D synchronization source is searched, the UE may acquire the time-frequency synchronization through the D2D synchronization signal/sequence received from the searched D2D synchronization source. In addition, the corresponding UE may transmit the D2D synchronization signal/sequence.

Further, a channel may be required, which is used for purpose of transferring required information used for the UE-to-UE communication together with synchronization and the channel for the purpose may be defined. The channel may be referred to as a physical D2D synchronization channel (PD2DSCH) or a physical sidelink broadcast channel (PSBCH).

Hereinafter, direct communication between two devices in the D2D communication is described as an example for clarity, but the scope of the present invention is not limited thereto and the same principle described in the present invention may be applied even to D2D communication among two or more plural devices.

V2X Operation Scenario

1) Scenario 1

FIG. 9 illustrates V2X operation scenario 1 in a wireless communication system to which the present invention can be applied.

This scenario supports V2V operation only based on PC5 (i.e. direct interface between two devices supporting ProSe (e.g. D2D communication or V2X communication)).

In this scenario, a UE transmits a V2X message to multiple UEs at a local area in sidelink.

RAN aspects for PC5-based V2V operation (Tx/Rx of V2V message) are as follows:

i) Aspect 1: Operation bands used as test points for evaluation

Case 1A: 6 GHz

Case 1B: 2 GHz ii) Aspect 2: eNB deployment consideration including possibility of network control Case 2A: UE autonomous resource allocation, at least mode 2, based on semi-statically network-configured/pre-configured radio parameters including no eNB coverage case.

Case 2B: eNB providing more UE specific or/and more dynamic resource allocation including Mode 1 compared to case 2A.

iii) Aspect 3: Multi-carrier operation

Case 3A: UEs communicating over PC5 across a single carrier.

Case 3B: UEs communicating over PC5 across multiple carriers.

iv) Aspect 4: Operating scenarios

Case 4A: Single operator operation

Case 4B: A set of PC5 operation carrier(s) is shared by UEs subscribed to different operators. This means that UEs belonging to different operators may transmit on the same carrier.

Case 4C: Each operator is allocated with a different carrier. This means that a UE transmits only on the carrier allocated to the operator which it belongs to.

v) Aspect 5: Co-existing with Uu

Case 5A: Dedicated carrier for V2x. There is no uplink (Uu) traffic on the PC5 operation carrier.

Case 5B: V2x carrier is shared with Uu.

2) Scenario 3A

FIG. 10 illustrates V2X operation scenario 3A in a wireless communication system to which the present invention can be applied.

In this scenario, a UE transmits a V2X message to other UEs in sidelink. One of the receiving UEs is a UE type Road Side Unit (RSU) which receives the V2X message in sidelink and transmits it to E-UTRAN in uplink. E-UTRAN receives the V2X message from the UE type RSU and then transmits it to multiple UEs at a local area in downlink.

To support this scenario, E-UTRAN performs uplink reception and downlink transmission of V2X messages. For downlink, E-UTRAN may use a broadcast mechanism.

3) Scenario 3B

FIG. 11 illustrates V2X operation scenario 3B in a wireless communication system to which the present invention can be applied.

In this scenario, a UE transmits a V2X message to E-UTRAN in uplink and E-UTRAN transmits it to one or more UE type RSUs. Then, the UE type RSU transmits the V2X message to other UEs in sidelink.

To support this scenario, E-UTRAN performs uplink reception and downlink transmission of V2X messages. For downlink, E-UTRAN may use a broadcast mechanism.

RAN aspects for Uu/PC5-based V2V operation (Tx/Rx of V2X message) in this scenario are as follows:

i) Aspect 1: Operation bands used as test points for evaluation

For PC5: Applying all the cases in the corresponding aspect of Scenario 1.

For Uu: Applying all the cases in the corresponding aspect of Scenario 2.

ii) Aspect 2: eNB deployment consideration including possibility of network control For PC5: Applying all the cases in the corresponding aspect of Scenario 1.

For Uu: Applying all the cases in the corresponding aspect of Scenario 2.

iii) Aspect 3: Multi-carrier operation

For PC5: Applying all the cases in the corresponding aspect of Scenario 1.

For UL: Applying all the UL cases in the corresponding aspect of Scenario 2.

For DL: Applying all the DL cases in the corresponding aspect of Scenario 2.

iv) Aspect 4: Operating scenarios

For PC5: Applying all the cases in the corresponding aspect of Scenario 1.

For Uu: Applying all the cases in the corresponding aspect of Scenario 2.

For both PC5 and Uu:

Case 4.1: PC5 operation carrier and Uu operation carrier are allocated to the same operator.

Case 4.2: PC5 operation carrier and Uu operation carrier are allocated to different operators. In this case, it is assumed that uplink operation carrier and downlink operation carrier are allocated to the same operator.

v) Aspect 5: Co-existing with Uu/sidelink

Case 5A: Dedicated operation carrier for V2X on which there is sidelink traffic but no uplink (Uu) traffic, i.e. uplink and sidelink are on different carriers.

Case 5B: The uplink carrier is shared with sidelink, i.e. uplink and sidelink are on the same carrier.

vi) Aspect 6: Single/multiple eNB

Applying all the cases in the corresponding aspect of Scenario 2.

Method for collision avoidance in V2X services

In the present invention, a method of efficiently providing V2X (Vehicular to Everything) service in a mobile communication system such as 3GPP GSM/UMTS/EPS (Evolved Packet System).

In Scenario 1, UEs (vehicle-UE included) directly transmits/receives a V2X message by using PC5(Sidelink). On the other hand, in Scenario 3A, RSU transfers a V2X message having received from an UE, via an eNB to other UE. In this way, the RSU transfers to other UE by relaying a message which is not transmitted by the UE, resulted from a limitation of transmission range etc.

Road Side Unit (RSU) may be defined by a stationary infrastructure entity supporting V2X applications that can exchange messages with other entities supporting V2X applications.

The RSU may be viewed as a V2X application receiving V2X messages via SGi, PC5 or LTE-Uu interface.

The RSU may be a logical entity that combines V2X application logic with the functionality of an eNB (referred to as eNB-type RSU) or UE (referred to as UE-type RSU).

Method for Collision Avoidance in V2X Services

In the present invention, proposed is a method of efficiently providing V2X (Vehicular to Everything) service in a mobile communication system such as 3GPP GSM/UMTS/EPS (Evolved Packet System).

In Scenario 1, UEs (vehicle-UE included) directly transmit/receive a V2X message by using PC5 (or Sidelink). On the other hand, in Scenario 3A, a RSU transfers the V2X message having received from an UE, via an eNB to other UE. In this manner, the RSU transfers a message to other UE by relaying the message which can not transmitted by the UE, resulted from a limitation of transmission range etc.

Road Side Unit (RSU) may be defined by a stationary infrastructure entity supporting V2X applications that can exchange messages with other entities supporting V2X applications.

The RSU may be viewed as a V2X application receiving V2X messages via SGi, PC5 or LTE-Uu interface.

The RSU may be a logical entity that combines V2X application logic with the functionality of an eNB (referred to as eNB-type RSU) or UE (referred to as UE-type RSU).

In other words, the RSU is considered as an entity having a function of relaying to other UE, by transmitting V2X message having received by an V2X application function of the RSU from other UE, directly to another UE by using the PC5, or transmitting it via a LTE-Uu to an eNB.

As shown above, in the Scenario 1, UE transmits the V2X message via the PC5 directly to other UE. Considering efficiency of a method to transmit a message, it may be preferred for the message to be transmitted in a broadcast (one-to-all transmission) manner rather than a unicast/multicast manner. However, since a PC5 resource of each cell is limited, a collision among the V2X message may be possibly occurred, when there are many number of UE having received the V2X service in cell as the V2X message is broadcasted.

In particular, in metropolitan area where many vehicles are densely occupied, and a rate of UE is relatively low, a usage rate of PC5 resource is high. That is, since a plurality of UEs is highly probable to simultaneously transmit the V2X message, a message reception may not be possible in a stable manner due to a collision among a message. As an example, as for a periodic V2X message (e.g., Cooperative Awareness Message (CAM)), since the message should be transmitted every 100 ms (500 ms in a dense area), in a region where many vehicles are densely positioned, an event-driven message with a relatively high priority such as Decentralized Environment Notification Message (DENM), may be highly probable not to be transferred in a stable manner due to a collision among a CAM message.

Thus, the present invention proposes a method for efficiently transmitting the V2X message in a region where it may be highly probable that a collision of V2X message is occurred, since the usage rate of the PC5 resource is high (a plurality of UE transmits the V2X message by using the PC5).

In particular, the present invention considers a wireless communication environment performing communication (V2X: Vehicle-to-Everything) between vehicles by using a wireless channel. The V2X includes a communication between a vehicle and all entities such as V2V (Vehicle-to-Vehicle) referring to communication between vehicles, V2I (Vehicle to Infrastructure) referring to communication between a vehicle and an eNB or RSU (Road Side Unit), V2P (Vehicle-to-Pedestrian) referring to communication a vehicle and a UE carried by an individual (pedestrian, bicycle driver, a vehicle driver or passenger) etc.

In the following, for the convenience of explanation, the present invention is mainly explained for the V2X service, but it is not limited to the V2X service, the present invention may be identically applicable to a direct communication between UEs as well.

In the following, for explanation of the present invention, UE may include not only a vehicle (or a UE for vehicle) but also a UE for which the V2X service is available.

Further, as for explanation of the following present invention, the UE which transmits the V2X message is referred to as a source UE and one or more UE which receives the V2X message via a relay of the RSU is referred to as a destination UE.

A method to efficiently transmit the V2X message for the V2X service proposed in the present invention may be configured for a combination as one or more operation of the following operations.

1. The source UE may transmit the V2X message (or Sidelink message, i.e. data transmitted via a PSSCH (Physical Sidelink Shared Channel)/PSBCH (Physical Sidelink Broadcast Channel)) via the PC5 (that is, it may be replaced with an interface for a direct communication between UEs, such as a sidelink, D2D link etc.). In other words, it implies that the source UE transmits the V2X message via the PC5, and/or receives the V2X message via the PC5.

In this case, the V2X message transmission scheme may be correspond to a broadcast scheme (i.e. one-to-all transmission), or a multicast scheme (i.e. one-to-many transmission) or a unicast scheme (i.e. one-to-one transmission).

2. The RSU is always in a LTE-Uu RRC connected state with the serving eNB.

The RSU may receive, via a PC5 listening, the V2X message transmitted by the source UE in the above No. 1.

If the RSU receives the V2X message from the source UE, then the RSU may determine a scheme to relay the V2X message received from the source UE to other destination UE.

In this case, the RSU may receive one or more information of the following information from other UE (e.g., source UE), eNB and/or V2X local server (and/or V2X Control Function), and determine the scheme to relay the received V2X message to the source UE based on the information.

i) receiving from an UE, information indicating information a current PC5 resource usage status ii) receiving from an eNB, information on the number of UE and/or a PC5 resource status used for the V2X service surrounding a corresponding RSU iii) receiving from a V2X local server and/or V2X Control Function (referred to as the V2X server), information on the number of UE and/or the PC5 resource status used for the V2X service surrounding a corresponding RSU That is, the RSU may identify a density of a neighbor vehicle (or UE), and estimate possibility in message collision based on the information. In other words, the RSU may calculate the PC5 resource usage rate value based on the above information denoted as i) to iii), determine the Relay scheme by comparing the value with a predetermined threshold or a threshold configured to a corresponding RSU (e.g., by an eNB).

3. The RSU may determine the Relay scheme based on the information denoted as No. 1 and/or 2, and perform one of the following operations.

A) when the Source UE Transmits the V2X Message to the RSU in One-to-One Transmission.

The RSU may transmit the V2X message received from the source UE via the LTE-Uu to the eNB, regardless of a UE type and/or a message type.

As described above, the UE may transfer data to be transmitted via an internal PC5 bearer and/or a LTE-Uu bearer from a higher layer (e.g., a PDCP layer or an application layer) to a lower layer (e.g., a MAC/PHY layer). Based on the data (that is, by determining from which bearer the data is transferred), the lower layer (e.g., the MAC/PHY layer) transmits a scheduling request to the eNB, and further transmits the PC5 resource BSR (i.e., the Sidelink BSR) or the LTE-Uu BSR to the eNB, and thus requests a resource from the eNB. When a resource allocated from the eNB is the PC5 resource, the UE transmits the V2X message via the PC5 resource directly to other UE, or when the allocated resource is the LTE-Uu resource, the V2X message is transmitted via the LTE-Uu Uplink to the eNB.

That is, when the source UE transmits the V2X message in the one-to-one transmission to the RSU, the RSU may always transfer the V2X message to the destination UE via the eNB through the LTE-Uu. More specifically, the scheduling request is transmitted to the eNB, and further the LTE-Uu BSR is transmitted to the eNB, and thus a resource is allocated from the eNB. In addition, the V2X message received from the source UE may be transmitted to the eNB on the allocated LTE-Uu uplink resource, regardless of the UE type and/or the message type.

In this case, for example, the RSU may determine whether it is transmitted in the one-to-one transmission based on a destination address in the received V2X message.

The eNB, to which the V2X is transferred from the RSU, may transfer to the destination UE by using the downlink. In this case, the eNB may use the unicast or broadcast (e.g., Multimedia Broadcast/Multicast Service (MBMS), single-cell point-to-multipoint (SC-PTM) etc.). Or, the received V2X message may be transferred to the V2X Application Server based on the predetermined configuration for processing the message.

Further, when a priority of the received V2X message (e.g., Proximity Service (ProSe) Per Packet Priority) is greater than or equal to a specific priority threshold, the RSU may always transfer the V2X message to the destination UE via the eNB through the LTE-Uu.

B) When the Source UE Transmits the V2X Message in the One-to-Many/all Transmission The RSU may perform one of the following operations, by comparing the PC5 usage rate acquired in the above No. 2 with a specific threshold value.

In this case, the threshold value may be prefixed.

Further, the threshold value may be with a non-static value and may be determined based on information on neighbor environment and information possessed by the RSU on its own value. As an example, the RSU may determine the threshold value based on one or more of the following factors.

In addition, the RSU compares the threshold value with the PC5 usage rate calculated in the No. 2, and thus the relay scheme may be determined. For example, when the UE surrounding the RSU is densely positioned, or when an amount of the PC5 resource usage surrounding the RSU is large, or when a type of the V2X message is required to be reliably transmitted, it may be preferred that the RSU transmits the V2X message on the LTE-Uu uplink resource to the eNB, and thus the threshold value may be configured to be relatively lower. On the other hand, the UE surrounding the RSU is sparse, or when an amount of the PC5 resource usage surrounding the RSU is small, or when a type of the V2X message is not required to be reliably transmitted, it may be preferred that the RSU transmits the V2X message on the PC5 resource directly to the destination UE, and thus the threshold value may be configured to be relatively higher.

Information on the number of UE and/or a current status of the PC5 resource usage surrounding the RSU For example, as the number of UE and/or the amount of PC5 resource usage surrounding the RSU is greater, the threshold value may be configured to be relatively lower. Further, the number of UE and/or the amount of the PC5 resource usage surrounding the RSU may be classified to be multiple classes with its predetermined range, and the threshold value may be determined to be corresponded to each of the classes.

Type of the V2X message which should be relayed (e.g. event-driven or periodic) and/or priority of the V2X message (e.g. Prose Per-Packet Priority).

For example, the Event-driven message may be correspond to a message generated when a vehicle accident is occurred, or when a message including contents on the accident is received, or when the accident may be highly probable to be occurred. Further, the Periodic message includes information on the current state of the UE (e.g. speed, direction, position etc.). Thus, a priority of the Event-driven message may be configured to be higher than that of the periodic message.

For example, the threshold value of the Event-driven message may be configured to be lower than that the Periodic message. Further, for each of the V2X message type, the threshold value may be configured to be corresponded to the type.

Or, when the received V2X message is the periodic message, the RSU, regardless of another factor (e.g., UE type), may not perform a relay operation (i.e. dropping).

This message type may be determined at the application layer, and may be transferred to the lower layer (a layer below the application layer, e.g., the MAC layer). In addition, this message type may be identified by using a layer-2 identifier (ID) (or MAC layer ID) attached to a packet received at the lower layer from the application layer. As an example, when the layer-2 ID is set as a specific destination layer-2 ID, the message type may be configured to indicate the event-driven message or the periodic message. Thus, when the lower layer of the RSU (a layer below the application layer, e.g., the MAC layer) receives the V2X message, which type of the V2X message may be identified based on the layer-2 ID of a corresponding V2X message.

Characteristics of the source UE which transmits the V2X message which should be relayed (e.g. normal UE (a private vehicle/terminal), public safety UE (police vehicle, fire vehicle, ambulance etc.). A priority of the public safety UE may be configured to be higher than that of the normal UE.

For example, a threshold of the public safety UE may be configured to be relatively lower than that of the normal UE. Further, for each UE type, the threshold value may be determined to be corresponded to the UE type.

This UE type may be determined at the application layer, and may be transferred to the lower layer (a layer below the application layer, e.g., the MAC layer). In addition, this UE type may be identified by using the layer-2 identifier (ID) (or the MAC layer ID) attached to a packet received at the lower layer from the application layer. As an example, when a specific layer-2 ID is set as a specific source layer-2 ID, it may be preconfigured in order to be informed that which type of UE transmits the V2X message. Thus, when the lower layer of the RSU (a layer below the application layer, e.g., the MAC layer) receives the V2X message, it may be identified that which type of the UE transmits the V2X message based on the layer-2 ID of a corresponding V2X message.

A parameter provided by the Network operator. When a region in which the RSU is installed is highly probable for a specific accident to be occurred, and/or when the number of the accident occurred is greater, the Network operator may provide the RSU with the parameter related to the above mentioned factor. For example, for each of region with constant area, a parameter such as a weight factor applied to the threshold may be provided from Network operator. In this case, the RSU may determine the threshold value by considering the parameter received from the Network operator with its priority.

For example, as a probability of occurrence and/or the number of occurrence of a specific accident is greater for the region in which the RSU is installed, the threshold value may be configured to be relatively low. Further, the probability of occurrence and/or the number of occurrence of a specific accident may be classified to be multiple classes with its predetermined range, and the threshold value may be determined to be corresponded to each of the classes.

The RSU compares the above predetermined threshold value with the PC5 usage rate calculated in the above No. 2, and thus one of the following operations (operation 1) or operation 2)) may be performed (That is, the relay scheme may be determined).

1) When the PC5 Usage Rate is Lower than the Threshold, One of the Following Operations May be Performed.

i) The RSU may request the PC5 resource allocation by transmitting the scheduling request to the eNB, or by transmitting the Sidelink BSR requesting the PC5 resource to the eNB.

At the same time (e.g., timing of transmitting the scheduling request to the eNB or timing of transmitting the Sidelink BSR to the eNB), the RSU may operate a timer which is predetermined or configured from the eNB.

If a response has not been received from the eNB until the timer is expired (i.e., if there is no PC5 resource which may be allocated at the eNB), the RSU may transmit the scheduling request and/or LTE-Uu resource BSR to the eNB for requesting of the LTE-Uu resource allocation.

Then, when the LTE-Uu uplink resource is allocated at the RSU from the eNB, the V2X message received on the allocated LTE-Uu uplink resource may be transmitted to the eNB.

ii) The RSU may transmit the scheduling request to the eNB, and further may transmit to the eNB, the Sidelink BSR for requesting the PC5 resource and the BSR for the LTE-Uu resource.

If the eNB only transmits a response (i.e., allocates a resource) to any one of two resources (i.e. PC5 or LTE-Uu), then the RSU may relay the V2X message by using the allocated resource.

Or, if the eNB transmits a response (i.e., allocates a resource) to two resources (i.e. PC5 and LTE-Uu), then the RSU may select any one of two resource which is allocated, and may relay the V2X message by using the selected resource. In this case, the RSU may randomly select a resource, or may select a resource with its high priority when a priority is pre-configured for a specific resource.

The RSU uses any one of the two following methods, and thus may transmit the V2X message by using the acquired resource.

If the PC5 resource is acquired (i.e. allocated or selected), then the V2X message may be transmitted by using D2D communication on a granted resource.

Or, if the LTE-Uu is acquired (i.e. allocated or selected), then the V2X message may be transmitted on a LTE-Uu UL resource. The eNB, to which the V2X message is transferred on the UL resource, may transfer it to destination UE by using the downlink. In this case, the eNB may use a unicast or broadcast/multicast (e.g., MBMS, SC-PTM etc.). Or, based on a predetermined configuration for processing a message, the received V2X message may be transferred to the V2X Application Server.

2) When the PC5 Usage Rate is Higher than the Threshold

The RSU may transmit the scheduling request to the eNB, and further transmit the BSR for the LTE-Uu resource, and thus may request the LTE-Uu resource.

When the LTE-Uu resource is allocated with the request, the RSU may transmit the V2X message on the allocated LTE-Uu UL resource to the eNB. The eNB, to which the V2X message is transferred, may transfer it to the destination UE by using the downlink. In this case, the eNB may use the unicast or broadcast/multicast (e.g., MBMS, SC-PTM etc.). Or, based on predetermined configuration for processing the message, the received V2X message may be transferred to the V2X Application Server.

FIG. 12 is a diagram illustrating a method of transmitting and receiving a message for a communication between UEs, according to the present invention.

In FIG. 12, for the convenience of explanation, the V2X message is shown as an example, but the present invention is not limited thereto and it may be interpreted as a message for a communication between UEs.

Referring to FIG. 12, a first UE (e.g., UE type RSU) receives the V2X message from a second UE (i.e., source UE) (S1201).

In this case, a V2X message transmission scheme may correspond to a broadcast scheme (i.e., one-to-all transmission), or a multicast scheme (i.e., one-to-many transmission) or a unicast scheme (i.e., one-to-one transmission).

The first UE calculates the resource usage rate of the PC5 (that is, it implies the direct link between UEs, and may be replaced with a term of the D2D link, or the sidelink etc.) (S1202).

Herein, the PC5 resource usage rate may be calculated based on current resource usage status information of the direct link between UEs, which is received at the first UE from other UE, eNB or V2X server and/or the number of UE surrounding the first UE, which is received from the eNB.

The first UE determines the relay scheme of the V2X message, by comparing the calculated resource usage rate with a predetermined threshold (S1203).

In the above step of S1203, when the first UE compares the PC5 resource usage rate with the threshold for determining the relay scheme, the threshold may be a prefixed value, or may be determined by the first UE based on a predetermined factor.

As explained in the above, the threshold may be determined by the first UE, by using any one or more of the number of UE and a resource usage status surrounding the first UE, a type of the V2X message, a type of the second UE, or parameters provided by a network operator.

For example, when the V2X message is an Event-driven message, the threshold of the V2X message may be configured to be lower than that of a periodic message. Further, when the type of the second UE is a public safety UE, the threshold of the type of the second UE may be configured to be lower than that of a normal UE.

In this case, the first UE may identify the type of the V2X message and/or the type of the second UE from a second layer (e.g., MAC layer ID) of the received V2X message.

The first UE may transfer the V2X message to the third UE based on the determined relay scheme (S1204a, S1204b). That is, the first UE may transfer the V2X message via the eNB to the third UE (S1204a), or may transfer the V2X message directly to the third UE throught the direct link between UEs (S1204b) based on the determined relay scheme.

In this case, if the V2X message is transmitted from the second UE in a unicast scheme, then the first UE may transfer the V2X message via the eNB to the third UE (i.e., destination UE)(S1204a). That is, the first UE may transmit the BSR for allocating the uplink resource to the eNB, and may transmit the V2X message on the uplink resource allocated from the eNB. The eNB may transmit the V2X message to the third UE on the downlink resource. In this manner, when the V2X message is transmitted from the second UE in the unicast scheme, the above step of S1202 and S1203 may be omitted.

On the other hand, when the V2X message is transmitted from a second UE in the multicast scheme or broadcast scheme, the first UE may transfer the V2X message via the eNB to the third UE (S1204a), or the first UE may transfer it through the direct link between UEs directly to the third UE (S1204b) based on the determined relay scheme.

If the resource usage rate is lower than the threshold, then the first UE may transmit the BSR (i.e., sidelink BSR) for allocating the resource of the direct link between UEs to the eNB. In addition, the first UE may transmit the V2X message directly to the third UE on the resource of the direct link between UEs which is allocated from the eNB (S1204b).

In this case, at the same time when the first UE transmits the BSR to the eNB, (or the first UE transmits the scheduling request), a predetermined timer may be operated. In this case, when the resource of the direct link between UEs is not allocated from the eNB, until the timer is expired, the first UE may transmit the BSR to the eNB for allocating uplink (UL) resource. In addition, the first UE may transfer the V2X message via the eNB to the third UE, by transmitting the V2X message to the eNB on the uplink resource allocated from the eNB (S1204a).

Or, if the resource usage rate is lower than the threshold, then the first UE may transmit to the eNB both a first BSR for allocating the resource of the direct link between UEs and a second BSR for allocating the UL resource. In this case, if the resource of the direct link between UEs is allocated from the eNB, then the first UE may transmit the V2X message directly to the third UE transmit on the allocated resource of the direct link between UEs (S1204b). On the other hand, if the uplink resource is allocated from the eNB, then the first UE may transfer the V2X message via the eNB to the third UE, by transmitting the V2X message to the eNB on the allocated uplink resource (S1204a).

Herein, if both the resource of the direct link between UEs and uplink resource is allocated from the eNB, then the first UE may select one resource of the allocated resource of the direct link between UEs and the allocated uplink resource.

In this case, the first UE may select one resource based on a random or predetermined priority of the allocated resource of the direct link between UEs and the allocated uplink resource.

In addition, the first UE may transfer the V2X message to the third UE on the selected resource (S1204a, S1204b).

In other words, if the resource of the direct link between UEs is selected, then the first UE may transmit the V2X message directly to the third UE on a resource of the direct link between UEs (S1204b). On the other hand, if the uplink resource is selected, then the first UE may transfer the V2X message via the eNB to the third UE, by transmitting the V2X message to the eNB on the selected uplink resource (S1204a).

If the resource usage rate is higher than the threshold, then the first UE may transmit the BSR to the eNB for allocating the UL resource. In addition, the V2X message may be transferred via the eNB to the third UE, by transmitting the V2X message to the eNB on the uplink resource allocated from the eNB (S1204a).

Device to which the Present Invention can be Applied

FIG. 13 is a block diagram illustrating a configuration of a communication device according to an exemplary embodiment of the present invention.

Referring to FIG. 13, a wireless communication system includes a network node 1310 and a plurality of UEs 1320.

The network node 1310 includes a processor 1311, a memory 1312, and a communication module 1313. The processor 1311 implements a function, a process and/or a method suggested in FIGS. 1 to 12. Layers of a wired/wireless interface protocol may be implemented by the processor 1311. The memory 1312 is connected to the processor 1311 to store various information for driving the processor 1311. The communication module 1313 is connected to the processor 1311 to transmit and/or receive a wired/wireless signal. The network node 1310 may be, for example, a base station, an MME, a HSS, a SGW, a PGW, a SCEF, a SCS/AS, a Prose Function, eNB type-RSU, Particularly, when the network node 1310 is a base station, the communication module 1313 may include a radio frequency (RF) unit for transmitting/receiving a wireless signal.

The terminal 1320 (for example, UE, UE type-RAU) includes a processor 1321, a memory 1322, and a communication module (or RF unit) 1323. The processor 1321 implements a function, a process and/or a method suggested in FIGS. 1 to 12. Layers of a wireless interface protocol may be implemented by the processor 1321. The memory 1322 is connected to the processor 1321 to store various information for driving the processor 1321. The communication module 1323 is connected to the processor 1321 to transmit and/or receive a wireless signal.

The memories 1312 and 1322 may exist at the inside or the outside of the processors 1311 and 1321 and may be connected to the processors 1311 and 1321, respectively, by well-known various means. Further, the network node 1310 (a case of a base station) and/or the UE 1320 may have a single antenna or multiple antennas.

FIG. 14 is a block diagram illustrating a configuration of a communication device according to an exemplary embodiment of the present invention.

Particularly, FIG. 14 is a block diagram specifically illustrating the UE of FIG. 13.

Referring to FIG. 14, the UE may include a processor (or a digital signal processor (DSP)) 1410, a RF module (or RF unit) 1435, a power management module 1405, an antenna 1440, a battery 1455, a display 1415, a keypad 1420, a memory 1430, a Subscriber Identification Module (SIM) card 1425 (this element may be selected), a speaker 1445, and a microphone 1450. The UE may include a single antenna or multiple antennas.

The processor 1410 implements a function, a process and/or a method suggested in FIGS. 1 to 12. A layer of a wireless interface protocol may be implemented by the processor 1410.

The processor 1410 is connected to the processor 1410 and stores information related to operation of the processor 1410. The memory 1430 may exist at the inside or the outside of the processor 1410 and may be connected to the processor 1410 by well-known various means.

The user inputs, for example, instruction information such as a phone number by pressing (touching) a button of the keypad 1420 or by voice activation using the microphone 1450. The processor 1410 processes to perform an appropriate function such as reception of such instruction information and calling with a phone number. Operational data may be extracted from the SIM card 1425 or the memory 1430. Further, for user recognition and convenience, the processor 1410 may display instruction information or driving information on the display 1415.

The RF module 1435 is connected to the processor 1410 to transmit and/or receive an RF signal. In order to start communication, the processor 1410 transfers, for example, instruction information to the RF module 1435 in order to transmit a wireless signal constituting voice communication data. The RF module 1435 is configured with a receiver and a transmitter in order to receive and transmit a wireless signal. The antenna 1440 performs a function of transmitting and receiving a wireless signal. When receiving a wireless signal, the RF module 1435 may transfer a signal in order to process by the processor 1410 and may convert a signal with a base band. The processed signal may be converted to audible or readable information output through the speaker 1445.

In the foregoing exemplary embodiments, constituent elements and characteristics of the present invention are combined in a predetermined form. Unless phrases explicitly represent, it should be considered that each constituent element or characteristic is selective. Each constituent element or characteristic may be executed in a form that does not combined with other constituent elements or characteristics. Further, by combining some configurations and/or characteristics, an exemplary embodiment of the present invention may be configured. The order of operations described in exemplary embodiments of the present invention may be changed. Some configurations or characteristics of any exemplary embodiment may be included in another exemplary embodiment or may be replaced with a configuration or a characteristic corresponding to another exemplary embodiment. It will become apparent that claims that are not in an explicit cited relation in the claims may configure an exemplary embodiment by combination and may be included in new claim by amendment after filing.

An exemplary embodiment of the present invention may be implemented by various means, for example, hardware, firmware, software, or combinations thereof. When implementing by hardware, an exemplary embodiment of the present invention may be implemented by at least one application specific integrated circuits (ASICs), digital signal processors (DSPs), digital signal processing devices (DSPDs), programmable logic devices (PLDs), field programmable gate arrays (FPGAs), a processor, a controller, a microcontroller, and a microprocessor.

When implementing by firmware or software, an exemplary embodiment of the present invention may be implemented in a form of a module, procedure, and function that perform the foregoing function or operation. A software code may be stored at a memory to be driven by a processor. The memory may be located at the inside or the outside of the processor and may transmit and receive data to and from the processor by already known various means.

It will become apparent to a person of ordinary skill in the art that the present invention may be embodied in different specific forms without deviating from essential features of the present invention. Therefore, it should be considered that the detailed description is not to limit the present invention but to illustrate it. Thus, it is intended that the present invention cover the modifications and variations of this invention provided they come within the scope of the appended claims and their equivalents.

What is claimed is:

1. A method of relaying a V2X (Vehicle-to-Everything) message in a wireless communication system supporting V2X communication, the method performed by a first UE (User Equipment) and comprising:

receiving the V2X message from a second UE;

calculating a resource usage rate of a direct link between a plurality of UEs;

determining a relay scheme of the V2X message by comparing the calculated resource usage rate to a predetermined threshold; and transmitting the received V2X message to a third UE based on the determined relay scheme, wherein the threshold is determined based on a type of the V2X message or a type of the second UE, wherein the threshold is lower when the V2X message is an event-driven message than when the V2X message is a periodic message, and wherein the threshold is lower when the second UE is a public safety UE than when the second UE is a normal UE.

2. The method of claim 1, wherein the received V2X message is transmitted via an eNB or directly transmitted via the direct link when the V2X message is received in a multicast scheme or a broadcast scheme.

3. The method of claim 2, wherein the threshold is determined based on at least one of a number of UEs surrounding the first UE, a resource usage status, or a parameter received from a network operator in addition to the type of the V2X message or the type of the second UE.

4. The method of claim 3, wherein at least the type of the V2X message or the type of the second UE is identified by an identifier of a Media Access Control layer.

5. The method of claim 3, wherein transmitting the received V2X message comprises:
 transmitting a Buffer Status Report (BSR) to the eNB for allocating a resource of the direct link when the calculated resource usage rate is lower than the threshold; and
 directly transmitting the received V2X message on the resource of the direct link allocated by the eNB.

6. The method of claim 3, wherein transmitting the received V2X message comprises:
 transmitting a Buffer Status Report (BSR) to the eNB for allocating an uplink (UL) resource when a resource of the direct link is not allocated by the eNB until a predetermined timer expires; and
 transmitting the received V2X message via the eNB by transmitting the received V2X message to the eNB on the UL resource allocated by the eNB.

7. The method of claim 2, wherein transmitting the received V2X message comprises:
 transmitting a first Buffer Status Report (BSR) to the eNB for allocating a resource of the direct link and transmitting a second BSR to the eNB for allocating an uplink (UL) resource when the calculated resource usage rate is lower than the threshold;
 directly transmitting the received V2X message on the resource of the direct link when the resource of direct link is allocated by the eNB; and
 transmitting the received V2X message via the eNB by transmitting the received V2X message to the eNB on the UL resource when the UL resource is allocated by the eNB.

8. The method of claim 7, wherein transmitting the received V2X message further comprises:
 selecting the allocated resource of the direct link or the allocated resource of the UL when both the resource of the direct link and the resource of the UL are allocated by the eNB;
 directly transmitting the received V2X message on the allocated resource of the direct link when the allocated resource of the direct link is selected; and
 transmitting the received V2X message via the eNB by transmitting the received V2X message to the eNB on the allocated UL resource when the allocated resource of the UL is selected.

9. The method of claim 8, wherein the resource is selected randomly or based on predetermined priorities of the allocated resource of the direct link and the allocated resource of the UL.

10. The method of claim 2, wherein transmitting the received V2X message further comprises:
 transmitting a Buffer Status Report (BSR) to the eNB for allocating an uplink (UL) resource when the calculated resource usage rate is higher than the threshold; and
 transmitting the received V2X message via the eNB by transmitting the received V2X message to the eNB on the UL resource allocated by the eNB.

11. The method of claim 1, wherein the resource usage rate is calculated based on current resource usage status information of the direct link or a number of UEs surrounding the first UE.

12. The method of claim 1, wherein the received V2X message is transmitted via the eNB when the V2X message is received from the second UE in a unicast scheme.

13. A first UE (User Equipment) relaying a V2X (Vehicle-to-Everything) message in a wireless communication system supporting V2X communication, the UE comprising:
 a communication module configured to transmit and receive a signal; and
 a processor configured to:
 control the communication module to receive the V2X message from a second UE;
 calculate a resource usage rate of a direct link between a plurality of UEs;
 determine a relay scheme of the V2X message by comparing the calculated resource usage rate to a predetermined threshold; and
 control the communication module to transmit the received V2X message to a third UE based on the determined relay scheme,
 wherein the threshold is determined based on a type of the V2X message or a type of the second UE,
 wherein the threshold is lower when the V2X message is an event-driven message than when the V2X message is a periodic message, and
 wherein the threshold is lower when the second UE is a public safety UE than when the second UE is a normal UE.

14. The UE of claim 13, wherein the received V2X message is transmitted via an eNB or directly transmitted via the direct link when the V2X message is received in a multicast scheme or a broadcast scheme.

15. The UE of claim 14, wherein the threshold is determined based on at least one of a number of UEs surrounding the first UE, a resource usage status, or a parameter received from a network operator in addition to the type of the V2X message or the type of the second UE.

16. The UE of claim 14, wherein transmitting the received V2X message comprises controlling the communication module to:
 transmit a first Buffer Status Report (BSR) to the eNB for allocating a resource of the direct link and transmitting a second BSR to the eNB for allocating an uplink (UL) resource when the calculated resource usage rate is lower than the threshold;
 directly transmit the received V2X message on the resource of the direct link when the resource of direct link is allocated by the eNB; and
 transmit the received V2X message via the eNB by transmitting the received V2X message to the eNB on the UL resource when the UL resource is allocated by the eNB.

17. The UE of claim 16, wherein transmitting the received V2X message further comprises:
 selecting the allocated resource of the direct link or the allocated resource of the UL when both the resource of the direct link and the resource of the UL are allocated by the eNB;
 controlling the communication module to directly transmit the received V2X message on the allocated resource of the direct link when the allocated resource of the direct link is selected; and
 controlling the communication module to transmit the received V2X message via the eNB by transmitting the received V2X message to the eNB on the allocated UL resource when the allocated resource of the UL is selected.

18. The UE of claim 14, wherein transmitting the received V2X message further comprises controlling the communication module to:
 transmit a Buffer Status Report (BSR) to the eNB for allocating an uplink (UL) resource when the calculated resource usage rate is higher than the threshold; and transmit the received V2X message via the eNB by transmitting the received V2X message to the eNB on the UL resource allocated by the eNB.

19. The UE of claim 13, wherein the resource usage rate is calculated based on current resource usage status information of the direct link or a number of UEs surrounding the first UE.

20. The UE of claim 13, wherein the received V2X message is transmitted via the eNB when the V2X message is received from the second UE in a unicast scheme.

* * * * *